(12) United States Patent
Yasuda

(10) Patent No.: US 10,536,179 B2
(45) Date of Patent: Jan. 14, 2020

(54) SWITCH MODULE

(71) Applicant: Murata Manufacturing Co., Ltd., Nagaokakyo-shi, Kyoto-fu (JP)

(72) Inventor: Junpei Yasuda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/944,817

(22) Filed: Apr. 4, 2018

(65) Prior Publication Data
US 2018/0227006 A1 Aug. 9, 2018

Related U.S. Application Data

(63) Continuation of application No. PCT/JP2016/081423, filed on Oct. 24, 2016.

(30) Foreign Application Priority Data

Oct. 26, 2015 (JP) ................. 2015-210246

(51) Int. Cl.
*H04B 1/16* (2006.01)
*H04B 1/18* (2006.01)
*H04W 76/15* (2018.01)

(52) U.S. Cl.
CPC .............. *H04B 1/18* (2013.01); *H04W 76/15* (2018.02)

(58) Field of Classification Search
CPC .......... H04B 1/18; H04B 1/006; H04W 76/15
USPC .................... 455/227, 552.1, 63.3
See application file for complete search history.

(56) References Cited

U.S. PATENT DOCUMENTS

| 6,380,823 | B1  | 4/2002 | Ikata et al. |
| 9,001,710 | B2* | 4/2015 | Uejima ................ H04B 1/006 370/282 |
| 9,031,516 | B2* | 5/2015 | Wang ................... H03H 7/38 333/101 |
| 2014/0203887 | A1 | 7/2014 | Murata et al. |
| 2015/0028963 | A1 | 1/2015 | Ebihara et al. |
| 2016/0127115 | A1 | 5/2016 | Hayafuji |

(Continued)

FOREIGN PATENT DOCUMENTS

| JP | 2000-349586 A | 12/2000 |
| JP | 2006-108734 A | 4/2006 |

(Continued)

OTHER PUBLICATIONS

Official Communication issued in International Patent Application No. PCT/JP2016/081423, dated Dec. 20, 2016.

*Primary Examiner* — Sonny Trinh
(74) *Attorney, Agent, or Firm* — Keating & Bennett, LLP

(57) ABSTRACT

A switch module includes a filter that allows a signal in a first frequency range to pass therethrough, a filter that allows a signal in a second frequency range to pass therethrough, an impedance load circuit, and an antenna switch including a common terminal connected to an antenna element, a first selection terminal connected to the filter, a second selection terminal connected to the filter, and a third selection terminal connected to the impedance load circuit. When only one frequency range is selected from among the first and second frequency ranges, the antenna switch connects the common terminal to only one of the first and second selection terminals and connects the common terminal to the third selection terminal.

20 Claims, 18 Drawing Sheets

(56) References Cited

U.S. PATENT DOCUMENTS

| | | | |
|---|---|---|---|
| 2018/0138927 A1* | 5/2018 | Nagumo | H04B 1/0057 |
| 2018/0331434 A1* | 11/2018 | Iiduka | H04B 1/18 |
| 2018/0343000 A1* | 11/2018 | Nosaka | H04B 1/00 |
| 2019/0036217 A1* | 1/2019 | Presti | H01Q 5/328 |
| 2019/0103843 A1* | 4/2019 | Aikawa | H03F 1/565 |
| 2019/0140669 A1* | 5/2019 | Aikawa | H04B 1/006 |
| 2019/0296708 A1* | 9/2019 | Takeuchi | H03H 9/70 |

FOREIGN PATENT DOCUMENTS

| | | | |
|---|---|---|---|
| JP | 2014-140115 A | 7/2014 | |
| JP | 2014-187647 A | 10/2014 | |
| JP | 2015-023557 A | 2/2015 | |
| WO | 2015/008557 A1 | 1/2015 | |

* cited by examiner

CONNECTION STATE 2 (CA)
EXAMPLE & COMPARATIVE EXAMPLE

CONNECTION STATE 1 (NON-CA)
EXAMPLE

CONNECTION STATE 1 (NON-CA)
COMPARATIVE EXAMPLE

COMPARISON BETWEEN IMPEDANCES OVER FIRST FREQUENCY
RECEIVE BAND IN CONNECTION STATE 1

CONNECTION STATE 2 (CA)

CONNECTION STATE 4
(NON-CA)

SWITCH MODULE

CROSS REFERENCE TO RELATED APPLICATIONS

This application claims the benefit of priority to Japanese Patent Application No. 2015-210246 filed on Oct. 26, 2015 and is a Continuation Application of PCT Application No. PCT/JP2016/081423 filed on Oct. 24, 2016. The entire contents of each application are hereby incorporated herein by reference.

BACKGROUND OF THE INVENTION

1. Field of the Invention

The present invention relates to a switch module for use in wireless communication.

2. Description of the Related Art

Recent cellular phones are demanded such that a single terminal supports a plurality of frequency ranges and wireless schemes (multiband and multimode support). A front-end circuit for multiband and multimode support is required to rapidly process a plurality of transmission/reception signals without deterioration of quality even when a carrier aggregation (CA) scheme is applied in which a plurality of transmission signals in different frequency ranges or a plurality of reception signals in different frequency ranges are simultaneously used by the same antenna as a single communication signal.

Japanese Unexamined Patent Application Publication No. 2014-187647 discloses an antenna control device capable of obtaining optimum antenna characteristics even when wireless signals are transmitted/received by using the CA scheme.

FIG. 10A is a block diagram illustrating a portion of the internal configuration of an RF unit 300 described in Japanese Unexamined Patent Application Publication No. 2014-187647. FIG. 10B is a block diagram illustrating a portion of the internal configuration of an antenna unit 370.

As illustrated in FIG. 10B, the antenna unit 370 is connected to an antenna, and the RF unit 300 illustrated in FIG. 10A is connected to the antenna unit 370 via terminals for an RF signal and an external setting signal ATSS. The RF unit 300 includes a diplexer 301, antenna switches 302-1 and 302-2, duplexers 303-1 to 303-4, power amplifiers 304-1 to 304-4, and a radio frequency integrated circuit 305. The radio frequency integrated circuit 305 supports a plurality of bands (frequency ranges), namely, LTE band 1 (B1), LTE band 2 (B2), LTE band 5 (B5), and LTE band 17 (B17). In the above-described configuration of the RF unit 300, a combination of bands in the CA mode is used, examples of which include (1) a combination of B1 and B5, (2) a combination of B1 and B17, (3) a combination of B2 and B5, and (4) a combination of B2 and B17.

Furthermore, as illustrated in FIG. 10B, the antenna unit 370 includes antenna tuners 370-1 and 370-2. Each of the antenna tuners 370-1 and 370-2 switches combinations of capacitive elements by using a switch in accordance with the external setting signal ATSS to change a combined capacitance of a plurality of capacitive elements, thereby optimizing the antenna characteristics.

In the antenna control device disclosed in Japanese Unexamined Patent Application Publication No. 2014-187647, however, a transmission line to propagate an RF signal is disposed between the antenna tuners 370-1 and 370-2 of the antenna unit 370 and the antenna switches 302-1 and 302-2 of the RF unit 300, and the transmission line has parasitic inductance. Thus, when the complex impedance seen on the antenna switch and duplexer side from the diplexer 301 is to be matched to the complex impedance seen on the antenna side from the diplexer 301, the parasitic inductance of the transmission line is added as a matching component in addition to the parallel capacitive component of the antenna tuner 370-2. In the CA mode and a non-CA mode, therefore, it is difficult to achieve accurate impedance matching by using the antenna tuner 370-2 in accordance with a change in the combination of LTE bands selected by the antenna switches 302-1 and 302-2. In addition, when the antenna tuner 370-1 is added in series in order to compensate for the parasitic inductance described above, a problem of an increase in propagation loss due to the parasitic resistance of the transmission line caused by the addition of the antenna tuner 370-1 arises.

SUMMARY OF THE INVENTION

Preferred embodiments of the present invention provide switch modules that are able to reduce signal propagation loss in a system that enables selection of a state in which a plurality of reception signals in different frequency ranges or a plurality of transmission signals in different frequency ranges are simultaneously used and a state in which some of the plurality of reception signals or some of the plurality of transmission signals are not used.

A switch module according to a preferred embodiment of the present invention is capable of selecting a state in which a first frequency range for wireless communication and a second frequency range for wireless communication that is a different frequency range from the first frequency range are simultaneously used. The switch module includes a first filter circuit that allows a signal in the first frequency range to selectively pass therethrough, a second filter circuit that allows a signal in the second frequency range to selectively pass therethrough, an impedance load circuit, and a switch circuit including a common terminal connected to an antenna element, a first selection terminal connected to an end of the first filter circuit, a second selection terminal connected to an end of the second filter circuit, and a third selection terminal connected to the impedance load circuit. The switch circuit switches a connection between the common terminal and at least one of the first selection terminal and the second selection terminal. When both of the first frequency range and the second frequency range are selected, the switch circuit connects the common terminal to the first selection terminal and the second selection terminal and does not connect the common terminal to the third selection terminal. When only one of the first frequency range and the second frequency range is selected, the switch circuit connects the common terminal to only one of the first selection terminal and the second selection terminal and connects the common terminal to the third selection terminal.

With this configuration, when an RF signal is propagated in a mode in which only one of the first frequency range and the second frequency range is selected, a filter circuit that allows the selected one frequency range to pass therethrough and the impedance load circuit are connected to the common terminal. That is, instead of a filter circuit corresponding to a frequency range that is not selected, the impedance load circuit, which is connected to the third selection terminal, is connected to the common terminal. Thus, the bandpass characteristics of RF signals in a state in which only one of the first frequency range and the second frequency range is selected is able to be made equivalent to the bandpass characteristics of RF signals in a state in which both the first frequency range and the second frequency range are selected, without adding an unnecessary inductance component and capacitive component. Therefore, in a system that enables selection of a state in which a plurality of reception signals in different frequency ranges or a plurality of transmission signals in different frequency ranges are simultaneously used and a state in which some of the plurality of reception signals or some of the plurality of transmission signals are not used, signal propagation loss is able to be reduced regardless of which state is selected.

The switch module may further include a switch control unit that, upon receipt of selection information of a frequency range to be used for wireless communication, outputs a control signal based on the selection information to the switch circuit. The switch control unit may output the control signal to the switch circuit so that when both of the first frequency range and the second frequency range are selected, the switch circuit connects the common terminal to the first selection terminal and the second selection terminal and does not connect the common terminal to the third selection terminal, and when only one of the first frequency range and the second frequency range is selected, the switch circuit connects the common terminal to only one of the first selection terminal and the second selection terminal and connects the common terminal to the third selection terminal.

Accordingly, the switch control unit included in the switch module switches the switch circuit in response to receipt of selection information of a frequency range to be used for wireless communication from the outside. Thus, the functionality of the switch module is able to be enhanced and transmission wiring of a control signal is able to be reduced, which enables high-speed switching.

Furthermore, the impedance load circuit may be a circuit that compensates for a complex impedance of a first circuit provided when only one of the first frequency range and the second frequency range is selected, so that the complex impedance of the first circuit is equal or substantially equal to a complex impedance of a second circuit provided when the first frequency range and the second frequency range are simultaneously used, the first circuit being configured such that only one of the first filter circuit and the second filter circuit is connected to the common terminal, the second circuit being configured such that the first filter circuit and the second filter circuit are combined together by the common terminal.

With this configuration, the impedance load circuit, which is connected to the third selection terminal, is a circuit that performs compensation so that the complex impedance of the first circuit is equal or substantially equal to the complex impedance of the second circuit. Thus, the bandpass characteristics of RF signals in a mode in which only one of the first frequency range and the second frequency range is selected are able to be made equivalent or substantially equivalent to the bandpass characteristics of RF signals in a mode in which both the first frequency range and the second frequency range are selected, without adding an unnecessary inductance component and capacitive component.

Furthermore, the switch module may operate in a carrier aggregation (CA) mode when both of the first frequency range and the second frequency range are selected, and may operate in a non-carrier aggregation (non-CA) mode when only one of the first frequency range and the second frequency range is selected.

With this configuration, signal propagation loss is able to be reduced regardless of which mode of the CA mode and the non-CA mode is selected at the operation of carrier aggregation with comparatively large power of a signal to be transmitted, which enables a reduction of reflection of a signal due to impedance mismatching, in particular, reflection of a transmission signal.

Furthermore, the switch module may be capable of simultaneously using at least two filter circuits out of n (n being a natural number greater than or equal to 2) filter circuits including the first filter circuit and the second filter circuit, each of the n filter circuits allowing a signal in a corresponding one of n frequency ranges including the first frequency range and the second frequency range to selectively pass therethrough. The switch module may further include the n filter circuits and m (m being a natural number greater than or equal to 1) impedance load circuits including the impedance load circuit. The switch circuit may include one common terminal, n selection terminals each connected to a corresponding one of the n filter circuits arranged to correspond to the n frequency ranges, and m selection terminals each connected to a corresponding one of the m impedance load circuits. When the n filter circuits are selected, the switch circuit may connect the common terminal to the n selection terminals corresponding to the n filter circuits and does not connect the common terminal to the m selection terminals corresponding to the m impedance load circuits. When (n−1) or less filter circuits are selected, the switch circuit may connect the common terminal to (n−1) or less selection terminals corresponding to the (n−1) or less filter circuits and connects at least one of the m impedance load circuits to at least one of the m selection terminal so that a complex impedance of a third circuit configured such that the (n−1) or less filter circuits are combined together by the common terminal is equal to a complex impedance of a fourth circuit configured such that the n filter circuits are combined together by the common terminal.

With this configuration, when an RF signal is propagated in a mode in which (n−1) or less frequency ranges are selected from among the n frequency ranges, (n−1) or less filter circuits that allow the selected (n−1) or less frequency ranges to pass therethrough and at least one of the m impedance load circuits are combined together by the common terminal. That is, instead of a filter circuit corresponding to a frequency range that is not selected, at least one of the m impedance load circuits connected to the m selection terminals is connected to the common terminal. Thus, the bandpass characteristics of RF signals in a mode in which (n−1) or less frequency ranges are selected are able to be made equivalent or substantially equivalent to the bandpass characteristics of RF signals in a mode in which the n frequency ranges are selected, without adding an unnecessary inductance component and capacitive component. Therefore, in a system that enables selection of a state in which a plurality of reception signals in different frequency ranges or a plurality of transmission signals in different frequency ranges are simultaneously used and a state in which some of the plurality of reception signals or some of the plurality of transmission signals are not used, signal propagation loss is able to be reduced regardless of which state is selected.

In addition, two or more impedance load circuits to be connected from among the m impedance load circuits are able to be variably selected in accordance with the combination of frequency ranges selected from among the n frequency ranges. This variable selection is able to make the combined capacitance for impedance compensation variable. Additionally, the m impedance load circuits are arranged to correspond to the m selection terminals, such that a plurality of selection terminals to be connected to the common terminal are selected from among the m selection terminals, thus achieving compensation impedances more than m. Therefore, the number of impedance load circuits to be arranged and the arrangement areas therefore are able to be reduced, which reduces the area of the switch module.

Furthermore, the impedance load circuit may be defined by a capacitive element.

When the impedance load circuit is defined by a capacitive element, it is preferable to remove, at maximum, an inductance component not contributing to impedance matching in order to optimize the bandpass characteristics of RF signals. From this viewpoint, in this configuration, the impedance load circuit is directly connected to the selection terminal of the switch circuit, which enables a reduction in the length of wiring between a selected filter circuit and the impedance load circuit. As a result, no unnecessary inductance component is added. Therefore, in a system that enables selection of a state in which a plurality of reception signals in different frequency ranges or a plurality of transmission signals in different frequency ranges are simultaneously used and a state in which some of the plurality of reception signals or some of the plurality of transmission signals are not used, a capacitive element of the impedance load circuit provides high-accuracy impedance matching between the antenna element and the filter circuit, which enables effective reduction of signal propagation loss.

Furthermore, an out-of-pass-band complex impedance of the first filter circuit and the second filter circuit may be capacitive.

With this configuration, a filter circuit that obtains complex impedance having capacitive characteristics outside the pass band is able to be accurately compensated for by an impedance load circuit defined by a capacitive element.

Furthermore, the first filter circuit and the second filter circuit may be surface acoustic wave filters or elastic wave filters with BAW (Bulk Acoustic Wave).

In particular, in the case of a surface acoustic wave (hereinafter referred to as SAW) filter or a BAW (Bulk Acoustic Wave) filter, the steepness of the bandpass characteristics is high and impedances over frequency ranges other than the excitation frequency (pass band) are capacitive. Therefore, in a system that enables selection of a state in which a plurality of reception signals in different frequency ranges or a plurality of transmission signals in different frequency ranges are simultaneously used and a state in which some of the plurality of reception signals or some of the plurality of transmission signals are not used, a complex capacitive impedance is able to be accurately and easily compensated for by an impedance load circuit defined by a capacitive element, regardless of which state is selected.

Furthermore, the capacitive element may be defined by a chip that is identical or substantially identical to a chip for at least one of the first filter circuit and the second filter circuit.

Thus, the capacitive element of the impedance load circuit is able to be produced by the same or substantially the same process as that for a capacitive component that defined a filter circuit whose impedance is to be compensated for, which allows the directions of variations in the width, thickness, and other parameters of the capacitive elements of the impedance load circuit and the filter circuit to match. Therefore, the impedance load circuit is able to be accurately provided.

Furthermore, the first filter circuit and the second filter circuit may be surface acoustic wave filters that are defined by a piezoelectric substrate and interdigital transducer electrodes provided on the piezoelectric substrate. The capacitive element may be defined by interdigital transducer electrodes provided on the piezoelectric substrate, which defines at least one of the first filter circuit and the second filter circuit. An arrangement direction of the interdigital transducer electrodes defining at least one of the first filter circuit and the second filter circuit, which are provided on the piezoelectric substrate, may be different from an arrangement direction of the interdigital transducer electrodes defining the capacitive element, which are provided on the piezoelectric substrate.

Accordingly, the impedance load circuit and the filter circuits are defined by the same chip, which enables a reduction in the size of the switch module. In addition, the arrangement direction of the interdigital transducer electrodes of the SAW filters and the arrangement direction of the interdigital transducer electrodes of the impedance load circuit, which are provided on the same chip, are different. Thus, the unnecessary excitation in the interdigital transducer electrodes is able to be reduced or prevented. Therefore, deterioration of electrical characteristics due to interference between signals in the SAW filter and the capacitive element is able to be reduced or prevented.

Furthermore, the capacitive element may be included in a single chip including the switch circuit.

Thus, the selection terminal, which is a connection point of the impedance load circuit and the switch circuit, is able to be removed. That is, an external connection terminal of the switch circuit is able to be removed. Thus, the size of the switch module is able to be reduced.

Switch modules according to preferred embodiments of the present invention are able to reduce signal propagation loss in a system that enables selection of a state in which a plurality of reception signals in different frequency ranges or a plurality of transmission signals in different frequency ranges are simultaneously used and a state in which some of the plurality of reception signals or some of the plurality of transmission signals are not used.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
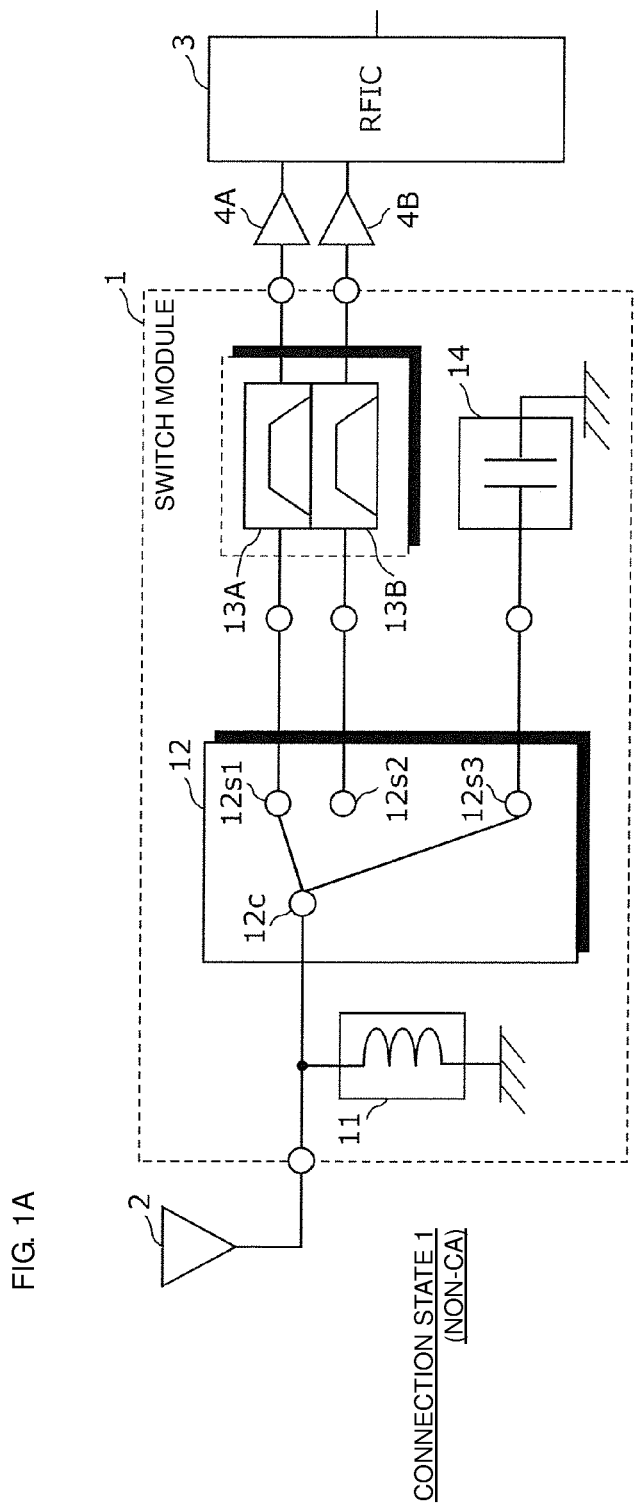
FIG. 1A is a circuit configuration diagram of a switch module according to Preferred Embodiment 1 of the present invention in a non-CA mode.

Preferred embodiments of the present invention will be described in detail hereinafter with reference to the drawings. All of the preferred embodiments described below provide general or specific examples. The values, shapes, materials, elements, the arrangements and connection configurations of the elements, and so on, which are indicated in the following preferred embodiments, are examples and are not intended to limit the present invention. The elements described in the following preferred embodiments are described as optionally added elements unless they are specified in the independent claim. In addition, the elements illustrated in the drawings are not representative of exact proportions or dimensions.

Preferred Embodiment 1

Figure 1B:
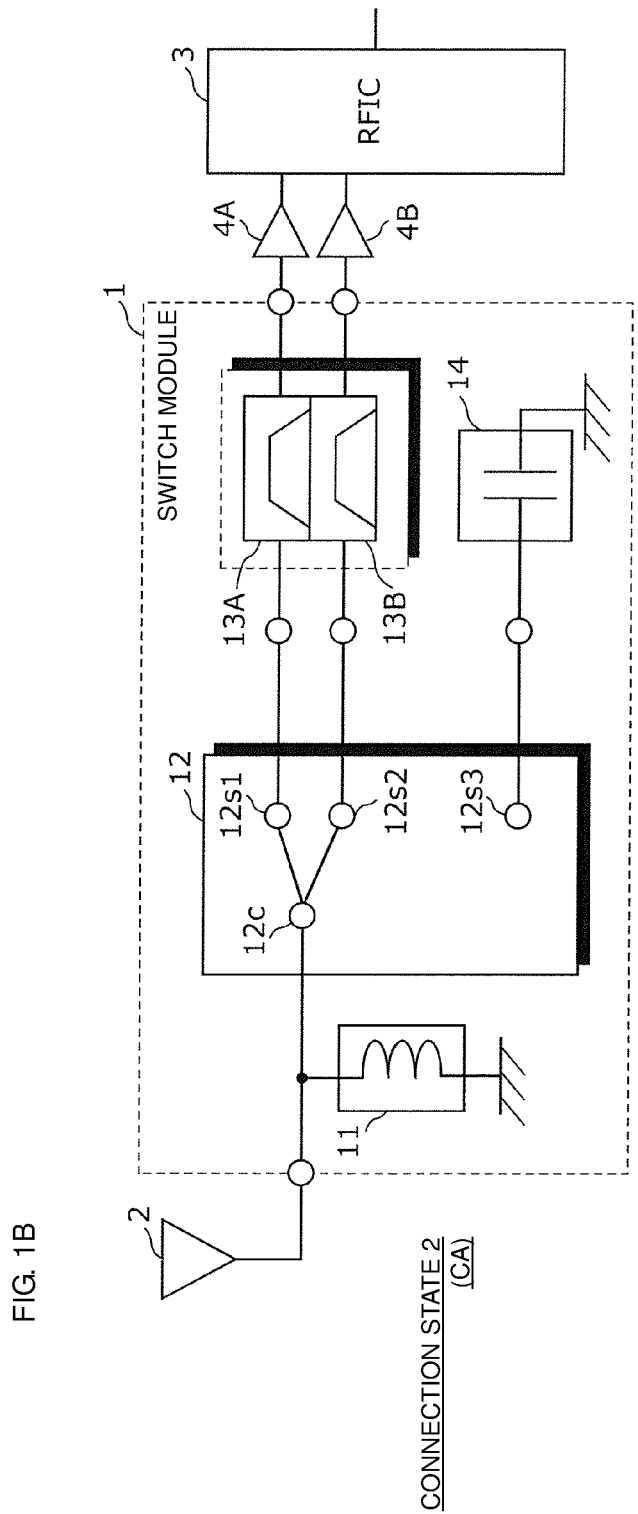
FIG. 1B is a circuit configuration diagram of the switch module according to Preferred Embodiment 1 of the present invention in a CA mode.

FIG. 1A is a circuit configuration diagram of a switch module 1 according to Preferred Embodiment 1 of the present invention in a non-CA mode. FIG. 1B is a circuit configuration diagram of the switch module 1 according to Preferred Embodiment 1 in a CA mode. FIG. 1A and FIG. 1B illustrate the switch module 1 according to Preferred Embodiment 1, an antenna element 2, reception signal amplifying circuits 4A and 4B, and an RF signal processing circuit (RFIC: Radio Frequency Integrated Circuit) 3. The switch module 1, the antenna element 2, and the reception signal amplifying circuits 4A and 4B are preferably disposed in a front-end unit of a multimode/multiband cellular phone, for example.

In a multiband and multimode wireless communication system, the switch module 1 is disposed between the antenna element 2 and the reception signal amplifying circuits 4A and 4B. The switch module 1 is preferably a radio-frequency switch module that switches connections between the antenna element 2 and signal paths to propagate reception signals in one or more frequency ranges selected from among a plurality of frequency ranges. The switch module 1 is provided with a plurality of signal paths to receive wireless signals by using a plurality of frequency ranges as carriers to achieve multimode/multiband support. Further, the switch module 1 is a circuit that switches a signal path to obtain optimum bandpass characteristics of a radio-frequency reception signal when receiving a wireless signal by using a carrier aggregation (CA) scheme and a non-CA scheme.

The switch module 1 includes an antenna matching circuit 11, an antenna switch 12, filters 13A and 13B, and an impedance load circuit 14.

The filter 13A is a first filter circuit that selectively propagates a radio-frequency (RF) reception signal in a first frequency range. The first frequency range is exemplified as, for example, LTE (Long Term Evolution) standard Band 1 (receive band: 2110 MHz to 2170 MHz).

The filter 13B is a second filter circuit that selectively propagates an RF reception signal in a second frequency range lower than the first frequency range. The second frequency range is exemplified as, for example, LTE standard Band 3 (receive band: 1805 MHz to 1880 MHz).

The impedance load circuit 14 is preferably a circuit defined by, for example, a capacitive element and having a complex impedance corresponding to the complex capacitive impedance of the filter 13A or the filter 13B.

The antenna switch 12 is a switch circuit including a common terminal 12c connected to the antenna element 2, a selection terminal 12s1 (first selection terminal) connected to an end of the filter 13A, a selection terminal 12s2 (second selection terminal) connected to an end of the filter 13B, and a selection terminal 12s3 (third selection terminal) connected to an end of the impedance load circuit 14. With the configuration described above, the antenna switch 12 switches a connection between at least one of the selection terminals 12s1 and 12s2 and the common terminal 12c.

The circuit configuration of the switch module 1 illustrated in FIG. 1A indicates connection state 1 in which the first frequency range is selected as a band to propagate an RF reception signal from among the first frequency range and the second frequency range. Connection state 1 corresponds to a non-CA mode in which only one frequency range is selected. As illustrated in FIG. 1A, in connection state 1 (non-CA), the antenna switch 12 connects the common terminal 12c to the selection terminal 12s1 and also connects the common terminal 12c to the selection terminal 12s3. In connection state 1, accordingly, a first circuit is provided in which the antenna element 2, the antenna switch 12, the filter 13A, and the impedance load circuit 14 are connected to each other.

The circuit configuration of the switch module 1 illustrated in FIG. 1B indicates connection state 2 when both of the first frequency range and the second frequency range are selected as bands for simultaneously propagating RF reception signals. Connection state 2 corresponds to a CA mode in which a plurality of frequency ranges are simultaneously selected. As illustrated in FIG. 1B, in connection state 2 (CA), the antenna switch 12 connects the common terminal 12c to the selection terminal 12s1 and also connects the common terminal 12c to the selection terminal 12s2. In connection state 2, accordingly, a second circuit is provided in which the antenna element 2, the antenna switch 12, and the filters 13A and 13B are connected to each other.

The impedance load circuit 14 is a circuit that compensates for the complex impedance of the first circuit so that the complex impedance seen on the filter side from the common terminal 12c in the first circuit is equal or substantially equal to the complex impedance seen on the filter side from the common terminal 12c in the second circuit. For example, when the filters 13A and 13B are SAW filters or BAW filters, the impedance load circuit 14 is defined by a capacitive element having an equivalent or substantially equivalent capacitance value of the filter 13B in the first frequency range.

That is, instead of the filter 13B corresponding to the second frequency range, which is not selected, the impedance load circuit 14, which is connected to the selection terminal 12s3, is connected to the common terminal 12c. Thus, the bandpass characteristics of RF signals in a mode in which only the first frequency range is selected are able to be made equivalent or substantially equivalent to the bandpass characteristics of RF signals in a CA mode in which both the first frequency range and the second frequency range are selected, without adding an unnecessary inductance component and capacitive component. Therefore, in a system that enables selection of the CA mode and the non-CA mode, signal propagation loss is able to be reduced regardless of which mode is selected.

For example, in a system with the first frequency range being Band 1 and the second frequency range being Band 3, the impedance load circuit 14 may be defined by a capacitive element having a capacitance (i.e., about 0.8 pF, for example) in the frequency range in Band 1, which is the first frequency range, the capacitance being equal or approximately equal to the equivalent capacitance of the filter 13B in Band 3, so that the complex impedance seen on the filter side from the common terminal 12c in a non-CA mode in which only Band 1 is selected is equal or substantially equal to the complex impedance seen on the filter side from the common terminal 12c in a CA mode in which both Band 1 and Band 3 are selected. In this preferred embodiment, a case in which only the first frequency range is selected is exemplified as a non-CA mode. However, the switch module 1 according to the present preferred embodiment is also applicable to a system in which only the second frequency range is selected in a non-CA mode. In this case, in a non-CA mode in which only the second frequency range is selected, the impedance load circuit 14 may be defined by a capacitive element having an equivalent or substantially equivalent capacitance value of the filter 13A in the second frequency range.

The switch module 1 according to the present preferred embodiment may preferably include a switch control unit that, upon receipt of selection information of the first frequency range and the second frequency range to be used for wireless communication, outputs a control signal based on the selection information to the antenna switch 12. In this case, the switch control unit outputs a control signal to the antenna switch 12, thus causing the antenna switch 12 to connect the common terminal 12c to only one of the selection terminals 12s1 and 12s2 and to connect the common terminal 12c to the selection terminal 12s3 when only one of the first frequency range and the second frequency range is selected. Accordingly, the switch control unit included in the switch module 1 switches the antenna switch 12 in response to receipt of the selection information from the outside. Thus, the functionality of the switch module 1 is able to be improved and transmission wiring of a control signal is able to be reduced, which enables high-speed switching.

The switch control unit may not necessarily be included in the switch module 1. Alternatively, the switch control unit may be included in the RF signal processing circuit 3 or in a baseband signal processing circuit connected subsequently to the RF signal processing circuit 3.

Figure 2A:
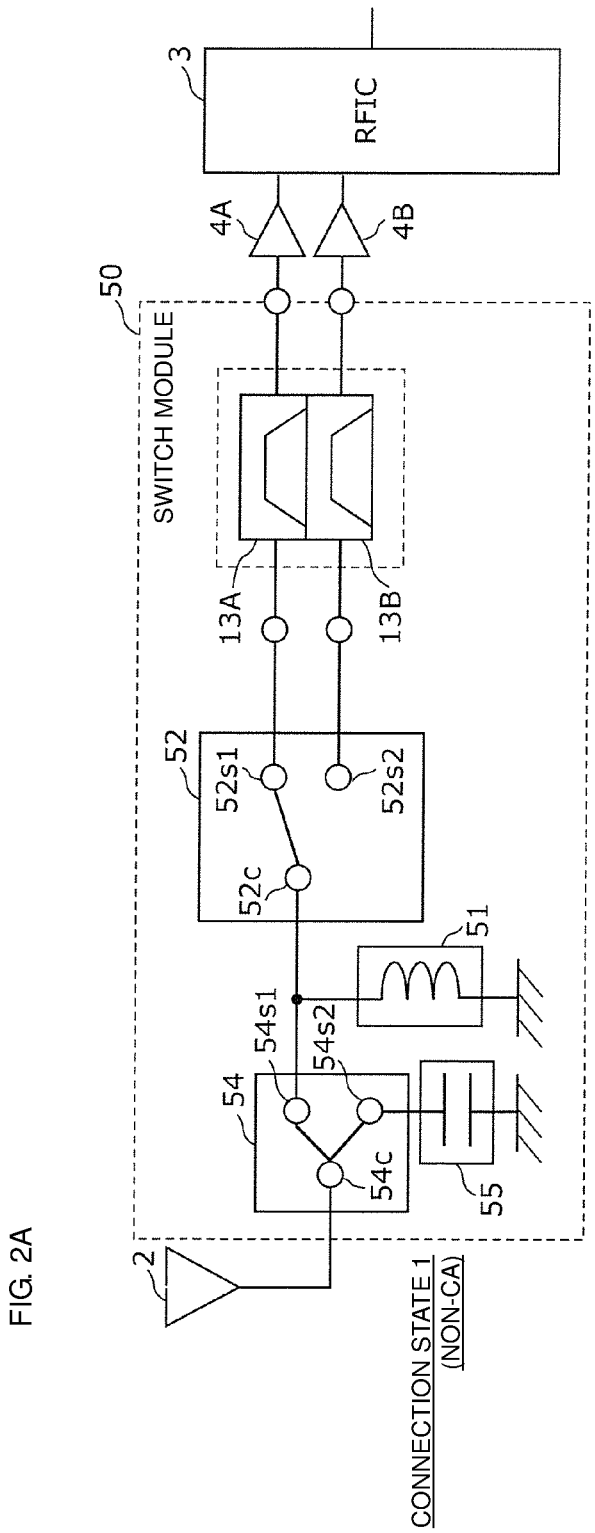
FIG. 2A is a circuit configuration diagram of a switch module according to a comparative example in the non-CA mode.
Figure 2B:
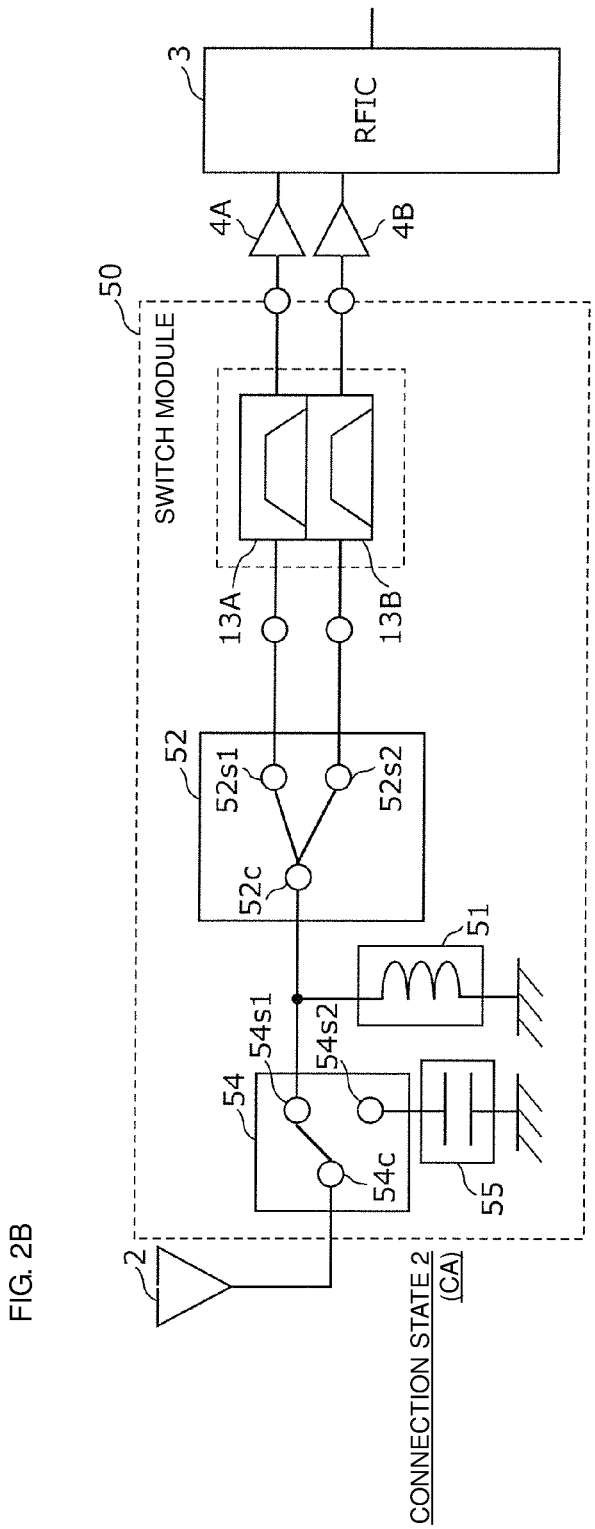
FIG. 2B is a circuit configuration diagram of the switch module according to the comparative example in the CA mode.

FIG. 2A is a circuit configuration diagram of a switch module 50 according to a comparative example in a non-CA mode. FIG. 2B is a circuit configuration diagram of the switch module 50 according to the comparative example in a state in which a plurality of reception signals in different frequency ranges or a plurality of transmission signals in different frequency ranges are simultaneously used as a single communication signal, that is, in a CA mode. FIGS. 2A and 2B illustrate the switch module 50 according to the comparative example, an antenna element 2, reception signal amplifying circuits 4A and 4B, and an RF signal processing circuit (RFIC) 3.

In the switch module 50 according to this comparative example, the arrangement and configuration of an impedance load circuit are different from those in the switch module 1 according to Preferred Embodiment 1. In the following, the switch module 50 will be described, focusing on differences from the switch module 1 without description of the common features.

The switch module 50 includes antenna matching circuits 51 and 55, antenna switches 52 and 54, and filters 13A and 13B.

The antenna switch 54 is a switch circuit including a common terminal 54c connected to the antenna element 2, a selection terminal 54s1 connected to a common terminal 52c of the antenna switch 52, and a selection terminal 54s2 connected to the antenna matching circuit 55. With the configuration described above, the antenna switch 54 switches between connection and non-connection of the antenna matching circuit 55 and the antenna element 2.

The antenna matching circuit 55 is a circuit defined by, for example, a capacitive element and having a complex impedance corresponding to the complex capacitive impedance of the filter 13A or the filter 13B.

The antenna switch 52 is a switch circuit including the common terminal 52c connected to the antenna switch 54, a selection terminal 52s1 connected to an end of the filter 13A, and a selection terminal 52s2 connected to an end of the filter 13B. With the configuration described above, the antenna switch 52 switches a connection between the common terminal 52c and at least one of the selection terminal 52s1 and the selection terminal 52s2.

The circuit configuration of the switch module 50 illustrated in FIG. 2A indicates connection state 1 when the first frequency range is selected as a band to propagate an RF reception signal from among the first frequency range and the second frequency range. As illustrated in FIG. 2A, in connection state 1 (non-CA), the antenna switch 52 connects the common terminal 52c to the selection terminal 52s1. Further, the antenna switch 54 connects the common terminal 54c to the selection terminal 54s1 and also connects the common terminal 54c to the selection terminal 54s2. In connection state 1, accordingly, a first comparative circuit is provided in which the antenna element 2, the antenna switches 54 and 52, the filter 13A, and the antenna matching circuit 55 are connected to each other.

The circuit configuration of the switch module 50 illustrated in FIG. 2B indicates connection state 2 when both of the first frequency range and the second frequency range are selected as bands to simultaneously propagate RF reception signals. As illustrated in FIG. 1B, in connection state 2 (CA), the antenna switch 52 connects the common terminal 52c to the selection terminal 52s1 and also connects the common terminal 52c to the selection terminal 52s2. Further, the antenna switch 54 connects the common terminal 54c to the selection terminal 54s1. In connection state 2, accordingly, a second comparative circuit is provided in which the antenna element 2, the antenna switches 54 and 52, and the filters 13A and 13B are connected to each other.

The antenna matching circuit 55 compensates for the complex impedance of the first comparative circuit so that the complex impedance seen on the filter side from the common terminal 52c in the first comparative circuit is equal or substantially equal to the complex impedance seen on the filter side from the common terminal 52c in the second comparative circuit. For example, when the filters 13A and 13B are SAW filters or BAW filters, the antenna matching circuit 55 is defined by a capacitive element having an equivalent or substantially equivalent capacitance value of the filter 13B in the first frequency range.

In the configuration of the switch module 50 according to this comparative example, however, the antenna switch 54 and a transmission line that connects the antenna switch 54 and the antenna switch 52 are interposed between the common terminal 52c and the antenna matching circuit 55. Thus, a parasitic inductance component or other similar component, which is not related to the equivalent capacitance of the filter 13B in the first frequency range, occurs between the antenna switch 52 and the antenna matching circuit 55. Accordingly, when the complex impedance seen on the filter side from the common terminal 52c is to be matched to the complex impedance seen on the antenna element 2 side from the common terminal 52c, the parasitic inductance or other similar of the transmission line is added as a matching component in addition to the parallel capacitive component of the antenna matching circuit 55. In the CA mode and the non-CA mode, therefore, it is difficult to achieve accurate impedance matching by using the antenna matching circuit 55 in accordance with a change in the combination of frequency ranges selected by the antenna switch 52. It is possible to add another antenna matching circuit in series between the antenna switches 52 and 54 in order to compensate for the parasitic inductance described above. In this case, however, a problem occurs of an increase in propagation loss due to the parasitic resistance in the transmission line caused by the addition of the antenna matching circuit, which is added in series.

Figure 3:
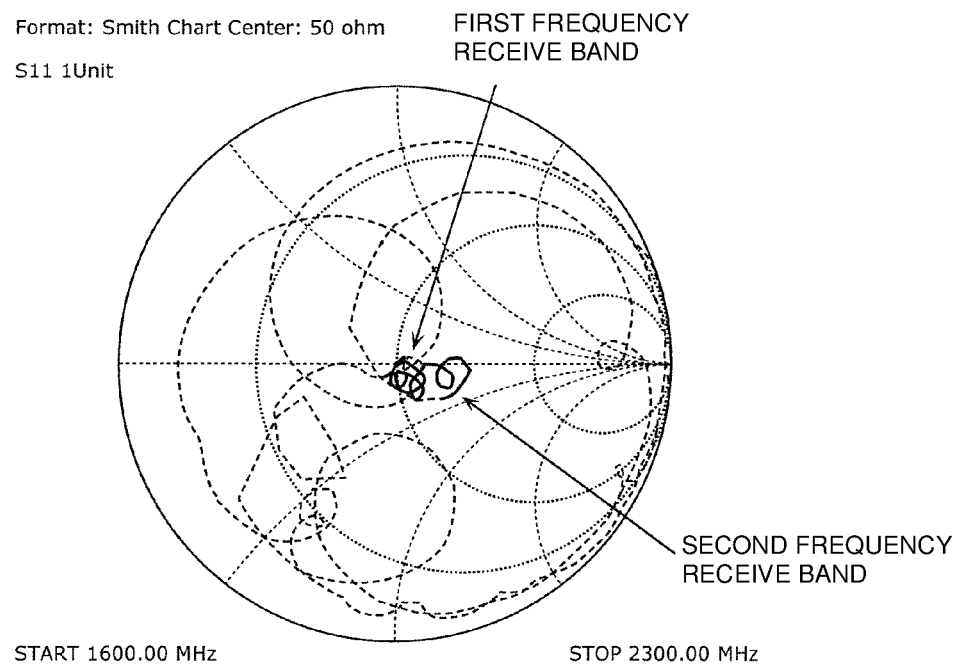
FIG. 3 is a Smith chart of the switch modules according to Preferred Embodiment 1 of the present invention and the comparative example in the CA mode.

FIG. 3 is a Smith chart of the switch modules according to Preferred Embodiment 1 and the comparative example in the CA mode. In the Smith chart illustrated in FIG. 3, the impedance seen on the filter side from the common terminal 12c in the switch module 1 according to Preferred Embodiment 1 illustrated in FIG. 1B in the CA mode and the impedance seen on the filter side from the common terminal 54c in the switch module 50 according to the comparative example illustrated in FIG. 2B in the CA mode are illustrated. In FIG. 3, the impedance characteristics of the switch module 1, described above, and the impedance characteristics of the switch module 50, described above, match each other. That is, the second circuit of the switch module 1 according to Preferred Embodiment 1, in which both of the filters 13A and 13B are connected and the impedance load circuit 14 is not connected, and the second comparative circuit of the switch module 50 according to the comparative example, in which both of the filters 13A and 13B are connected and the antenna matching circuit 55 is not connected, are equivalent circuits.

Figure 4A:
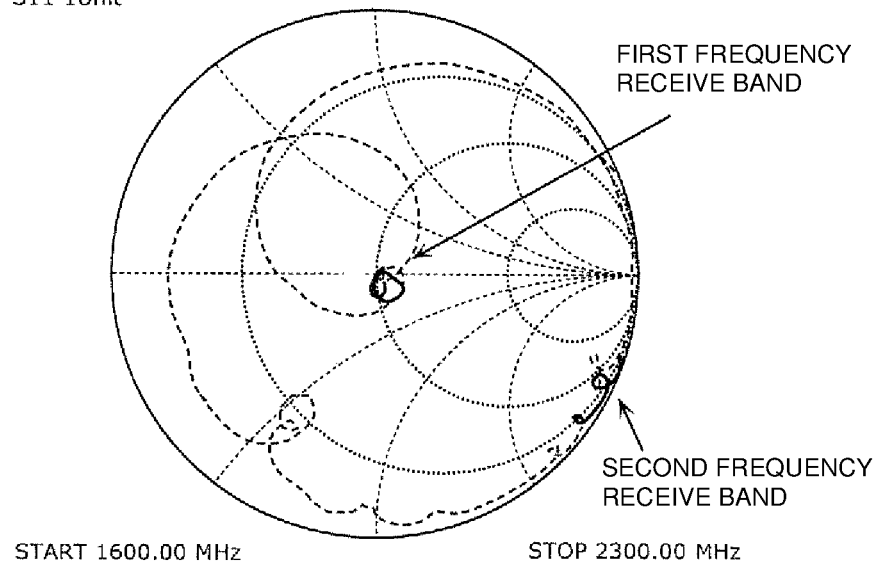
FIG. 4A is a Smith chart of the switch module according to Preferred Embodiment 1 of the present invention in the non-CA mode.
Figure 4B:
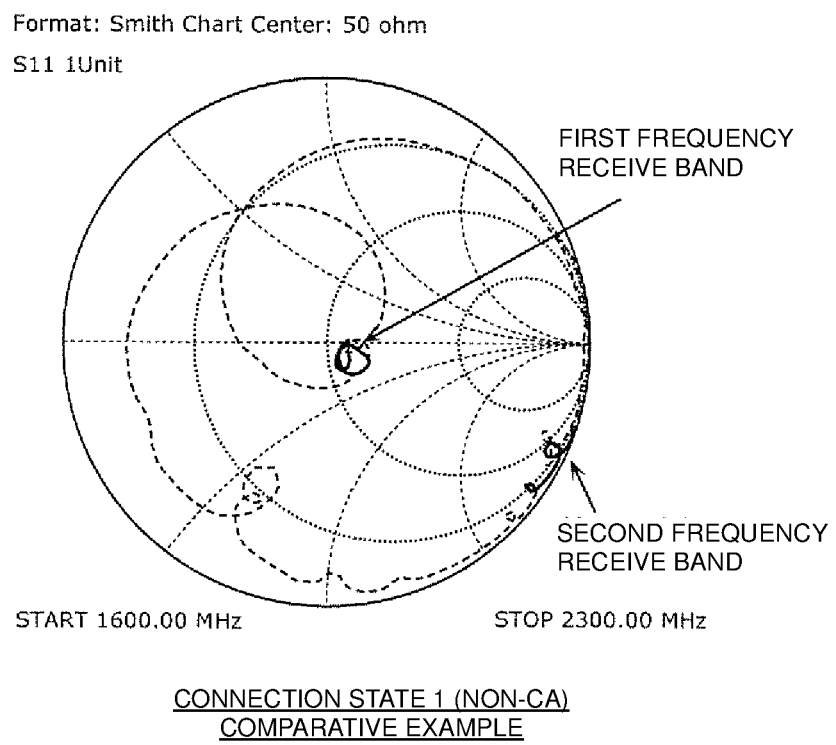
FIG. 4B is a Smith chart of the switch module according to the comparative example in the non-CA mode.
Figure 5:
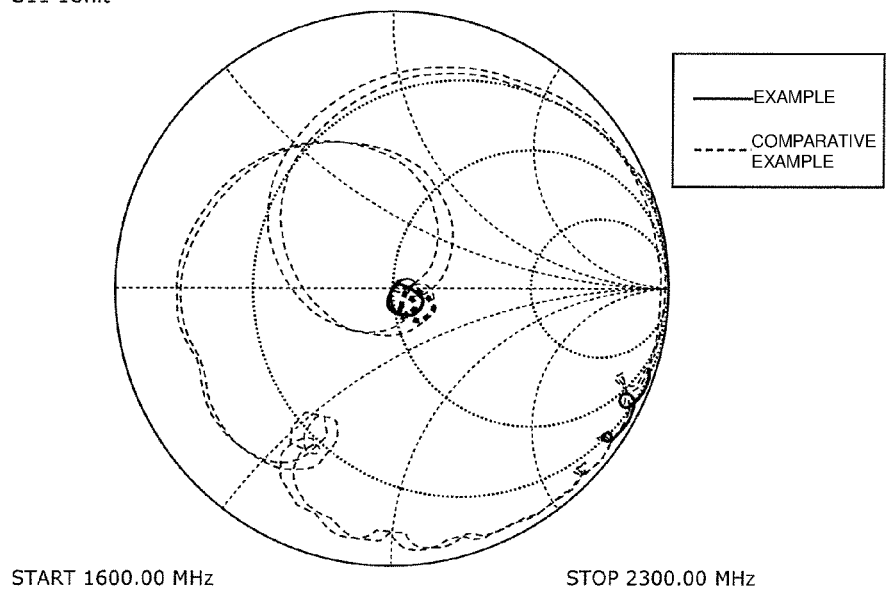
FIG. 5 is a Smith chart illustrating a comparison between impedances of the switch modules according to Preferred Embodiment 1 of the present invention and the comparative example in the non-CA mode.

FIG. 4A is a Smith chart of the switch module 1 according to Preferred Embodiment 1 in the non-CA mode. FIG. 4B is a Smith chart of the switch module 50 according to the comparative example in the non-CA mode. FIG. 5 is a Smith chart illustrating a comparison between impedances of the switch module 1 according to Preferred Embodiment 1 and the switch module 50 according to the comparative example in the non-CA mode.

As illustrated in FIG. 4B and FIG. 5, the complex impedance over the first frequency range (the solid line portion in FIG. 4B; the bold dashed line portion in FIG. 5) as seen on the filter side from the common terminal 54c of the switch module 50 according to the comparative example in the non-CA mode is shifted toward the high-impedance region relative to the complex impedance over the first frequency range illustrated in FIG. 3 (the solid line portion) in the CA mode. The impedance shift in the non-CA mode, described above, is caused by inaccurate matching of the complex impedance seen on the filter side from the common terminal 52c and the complex impedance seen on the antenna element 2 side from the common terminal 52c due to the parasitic inductance component or the like present between the antenna switch 52 and the antenna matching circuit 55.

As illustrated in FIG. 4A and FIG. 5, in contrast, the complex impedance over the first frequency range (the solid line portion in FIG. 4A; the solid line portion in FIG. 5) as seen on the filter side from the common terminal 12c of the switch module 1 according to Preferred Embodiment 1 in the non-CA mode approximately matches the complex impedance over the first frequency range illustrated in FIG. 3 in the CA mode.

Figure 6:
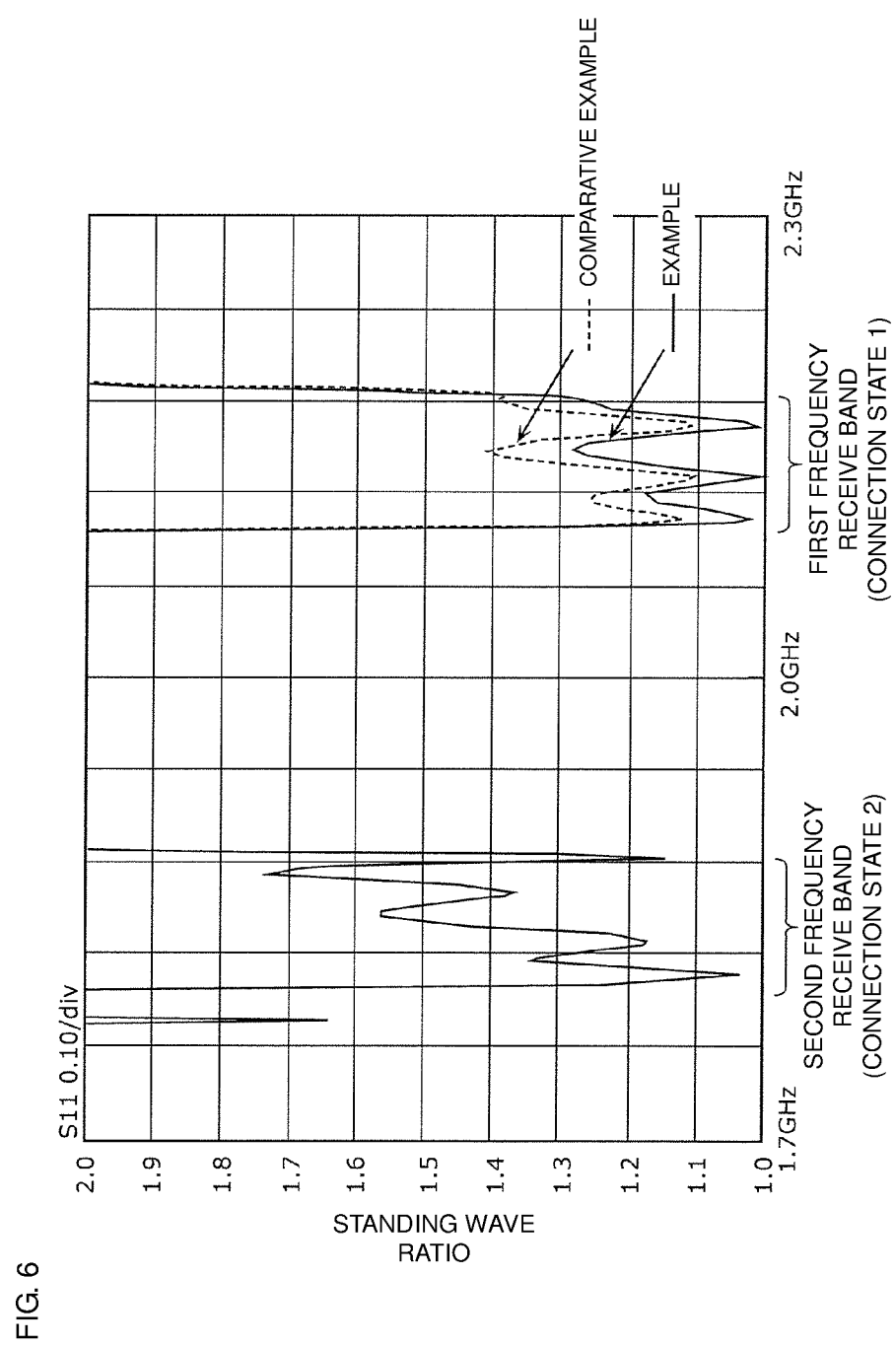
FIG. 6 is a graph depicting a comparison between standing wave ratios of the switch modules according to Preferred Embodiment 1 of the present invention and the comparative example.

FIG. 6 is a graph depicting a comparison between standing wave ratios of the switch modules according to Preferred Embodiment 1 and the comparative example. FIG. 6 illustrates the standing wave ratios over the first frequency range in the switch modules according to Preferred Embodiment 1 and the comparative example in connection state 1 (non-CA mode) and the standing wave ratios over the second frequency range in the switch modules according to Preferred Embodiment 1 and the comparative example in connection state 2 (CA mode). In FIG. 6, a difference in impedance characteristics over the first frequency range between the switch module 1 according to Preferred Embodiment 1 and the switch module 50 according to the comparative example is clearly identified. That is, it is clarified that, in connection state 1 (non-CA mode), the standing wave ratio over the first frequency range in the switch module 1 according to Preferred Embodiment 1 is lower than the standing wave ratio over the first frequency range in the switch module 50 according to the comparative example.

In the switch module 1 according to the present preferred embodiment, as described above, in the non-CA mode in which the first frequency range is selected, instead of the filter 13B corresponding to the second frequency range, which is not selected, the impedance load circuit 14, which is connected to the third selection terminal, is connected to the common terminal 12c. This enables the bandpass characteristics of RF signals in the non-CA mode to be equivalent or substantially equivalent to the bandpass characteristics of RF signals in the CA mode, compared with the comparative example described above, without adding an unnecessary inductance component and capacitive component. Therefore, in a system that enables selection of the CA mode and the non-CA mode, signal propagation loss is able to be reduced regardless of which mode is selected.

As described above, the complex impedances of the filters 13A and 13B may preferably be capacitive. This enables the complex impedance of a capacitive filter circuit to be compensated for by the impedance load circuit 14, which is defined by a capacitive element, at high accuracy with the parasitic inductance component removed.

For example, when the filters 13A and 13B are SAW filters or BAW filters, the steepness of the bandpass characteristics is high and impedances over frequency ranges other than the excitation frequency (pass band) are capacitive. Therefore, in a system that enables selection of the CA mode and the non-CA mode, the complex capacitive impedance of a SAW filter or a BAW filter is able to be accurately and easily compensated for by the impedance load circuit 14, which is defined by a capacitive element, regardless of which mode is selected.

As described above, furthermore, the impedance load circuit 14 is preferably defined by a capacitive element. When the impedance load circuit 14 is defined by a capacitive element, it is preferable to remove, at a maximum, an inductance component not contributing to impedance matching in order to optimize the bandpass characteristics of RF signals. From this viewpoint, in the present preferred embodiment, the impedance load circuit 14 is directly connected to the selection terminal 12s3 of the antenna switch 12, which enables a reduction in the length of wiring between a selected filter circuit and the impedance load circuit 14 via the common terminal 12c. As a result, no unnecessary inductance component is added. Thus, impedance matching between the antenna element 2 and a filter circuit is able to be achieved with high accuracy, which enables effective reduction of signal propagation loss.

In the switch module 1 according to the present preferred embodiment, a plurality of filters are combined together and connected (in parallel) via the antenna switch 12. With this configuration, in a specific usage state, some of the filters are disconnected and, at the same time, a dummy capacitor of the impedance load circuit 14 is connected to reduce impedance changes at the common terminal 12c, which is a combination connection point. In the configuration, furthermore, the dummy capacitor is disposed closer to the filter side than to the combination connection point (the common terminal 12c), compared with the comparative example.

In particular, when the filters 13A and 13B are capacitive filter elements, an unselected filter defines and functions as a capacitor in the pass band of a selected filter. If the number of parallel-connected filters changes due to the switching between the non-CA mode and the CA mode, the capacitive component of the filter(s) changes, which causes a change in impedance at the combination connection point. In the present preferred embodiment, a capacitive element is preferably connected as a dummy by using the impedance load circuit 14 so as to achieve a capacitance equal or substantially equal to the capacitance of filters that are connected as being combined together (in the CA mode). This is able to reduce or prevent complex impedance changes at the combination connection point (the common terminal 12c) even when the combination connection state of the filters is changed. Thus, deterioration of the reflection characteristics and bandpass characteristics of filter circuits is able to be reduced or prevented.

A circuit element other than a capacitive element, such as an inductive element, may be added to the impedance load circuit 14.

The impedance load circuit 14 may preferably be included in at least one of the chips for the antenna switch 12 and the filters 13A and 13B. Thus, the size of the switch module 1 is able to be reduced.

In particular, when the impedance load circuit 14 is defined by a capacitive element, the capacitive element may preferably be defined by a chip that is identical or substantially identical to a chip for at least one of the filters 13A and 13B. Thus, the capacitive element of the impedance load circuit 14 is able to be produced by the same or substantially the same process as that for a capacitive component that defines the filter 13A or 13B whose impedance is to be compensated for, which allows the directions of variations in the width, thickness, and other parameters of the capacitive elements of the impedance load circuit 14 and the filter circuit to match. Therefore, the impedance load circuit 14 is able to be accurately provided.

Figure 7:
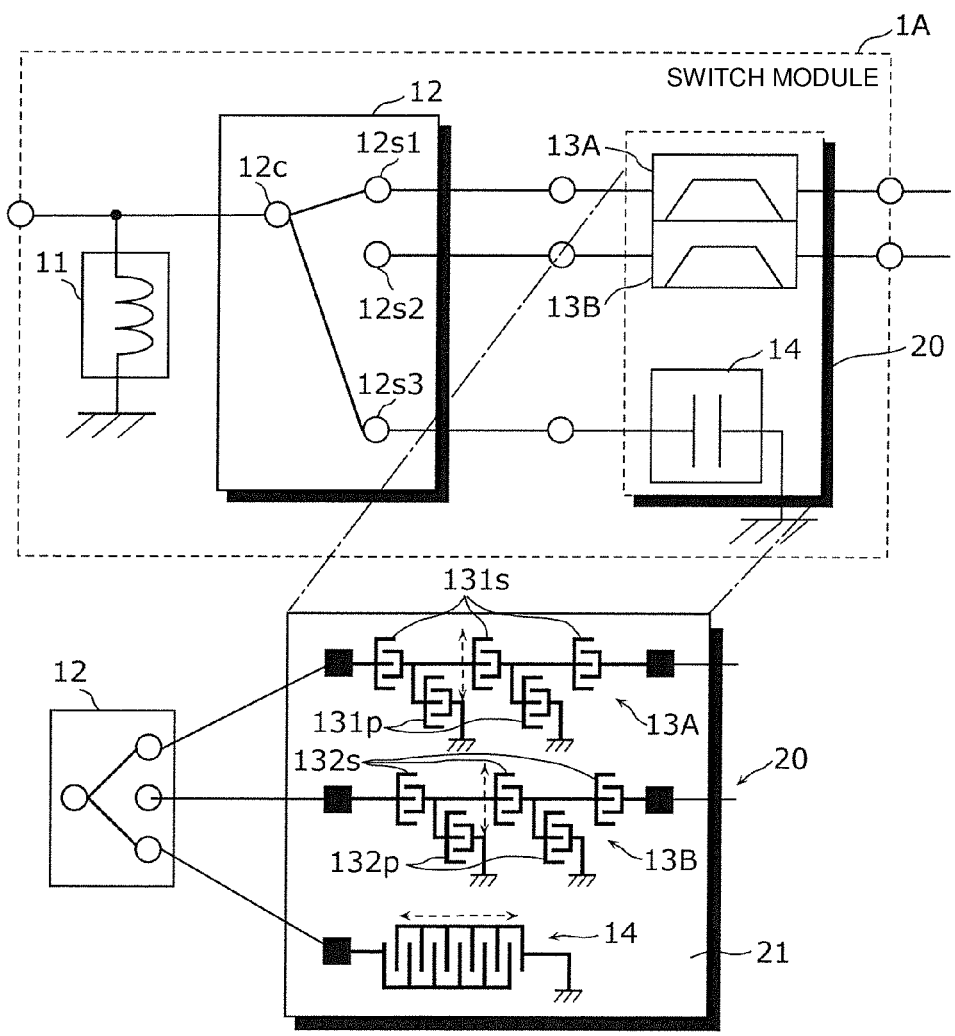
FIG. 7 is a configuration diagram of a switch module according to a modification of Preferred Embodiment 1 of the present invention.

FIG. 7 is a configuration diagram of a switch module 1A according to a modification of Preferred Embodiment 1. The switch module 1A illustrated in FIG. 7 has a different configuration from the switch module 1 according to Preferred Embodiment 1 in which the filters 13A and 13B and the impedance load circuit 14 are defined by a single chip, namely, a chip 20.

As illustrated in a lower portion of FIG. 7, the filters 13A and 13B and the capacitive element of the impedance load circuit 14 are provided on a common piezoelectric substrate 21. IDT (interdigital transducer) electrodes are provided on a surface of the piezoelectric substrate 21. For example, the filter 13A is preferably a ladder surface acoustic wave filter including three series resonators 131s and two parallel resonators 131p, which are defined by the piezoelectric substrate 21 and IDT electrodes. For example, the filter 13B is preferably a ladder surface acoustic wave filter including three series resonators 132s and two parallel resonators 132p, which are defined by the piezoelectric substrate 21 and IDT electrodes.

The capacitive element of the impedance load circuit 14 is defined by IDT electrodes provided on the piezoelectric substrate 21, which defines the filters 13A and 13B. The arrangement direction of the IDT electrodes defining the filters 13A and 13B provided on the piezoelectric substrate 21 is preferably different from the arrangement direction of the IDT electrodes defining the capacitive element of the impedance load circuit 14. In this modification, the arrangement direction of the IDT electrodes defining the filters 13A and 13B and the arrangement direction of the IDT electrodes defining the capacitive element are preferably different from each other by about 90 degrees, for example. That is, the direction of propagation of a radio-frequency signal in the IDT electrodes defining the filters 13A and 13B is different from the direction arrangement of the IDT electrodes defining the capacitive element.

Accordingly, the impedance load circuit 14 and the filter circuits are preferably defined by the same chip 20, which enables a reduction in the size of the switch module 1A. In addition, the arrangement direction of the IDT electrodes of the filter circuits and the arrangement direction of the IDT electrodes of the impedance load circuit 14, which are provided on the same chip 20, are different, which reduces or prevents the unnecessary excitation in the IDT electrodes.

Deterioration of electrical characteristics due to interference between signals in the filters 13A and 13B and the capacitive element is able to be reduced or prevented.

In this modification, by way of a non-limiting example, the filters 13A and 13B and the impedance load circuit 14 are defined by a single chip. One of the filters 13A and 13B and the impedance load circuit 14 may be defined by a single chip. This also reduces the size of a switch module.

The capacitive element of the impedance load circuit 14 may not be provided on the piezoelectric substrate 21 on which the filters 13A and 13B are provided as described above, but rather may be provided in a package accommodating the filters 13A and 13B. Alternatively, the capacitive element itself may be an SMD (Surface Mounted Device) component.

Although not illustrated in the drawings, the capacitive element of the impedance load circuit 14 may be included in a single chip including the antenna switch 12. Thus, the selection terminal 12s3, which is a connection point of the impedance load circuit 14 and the antenna switch 12, is able to be removed. That is, an external connection terminal of the antenna switch 12 is able to be removed. Therefore, the size of a switch module is able to be reduced. In addition, the antenna switch 12 is preferably defined by a CMOS (Complementary Metal Oxide Semiconductor) device. In this case, the capacitive element is also able be produced by the same CMOS process. Thus, a switch module is able to be manufactured at low cost.

Preferred Embodiment 2

In Preferred Embodiment 1, the description has been provided of a configuration in which the antenna switch 12 switches a plurality of signal paths along which reception signals pass. In the present preferred embodiment, in contrast, a description will be provided of a configuration in which a plurality of signal paths along which both reception signals and transmission signals pass are switched.

Figure 8A:
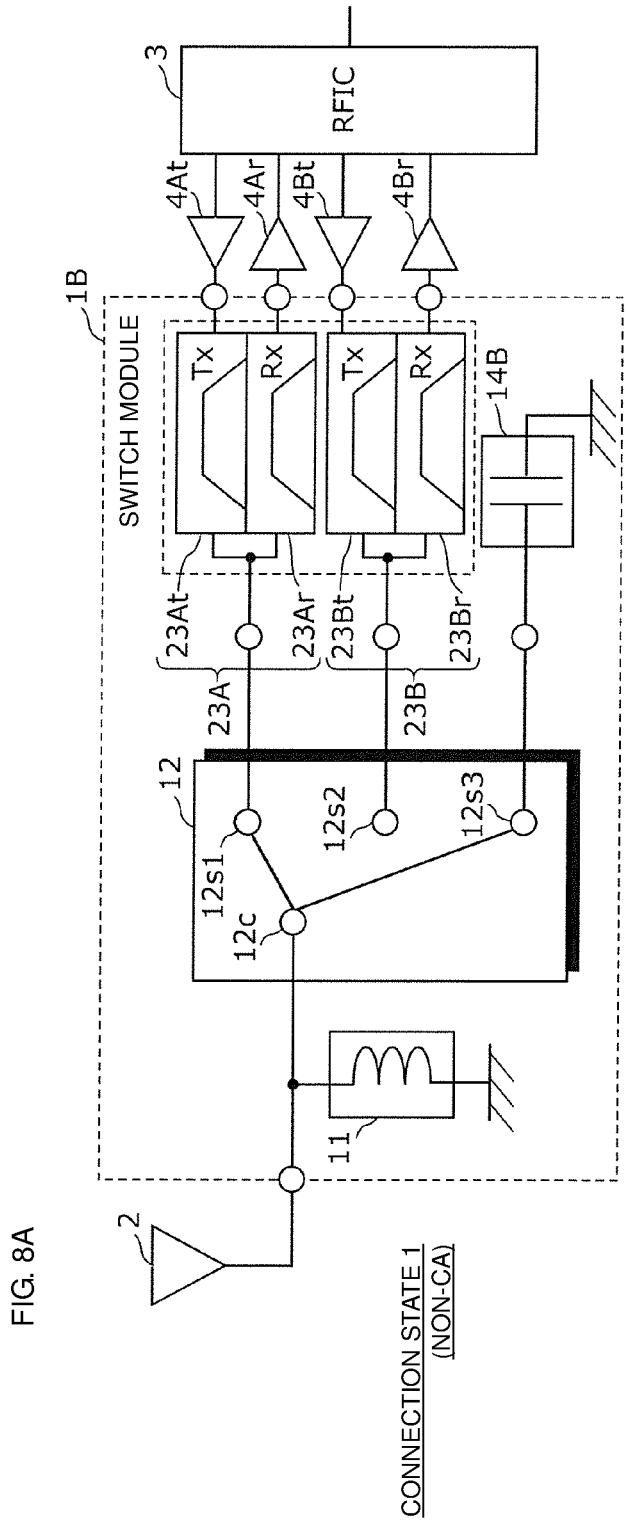
FIG. 8A is a circuit configuration diagram of a switch module according to Preferred Embodiment 2 of the present invention in the non-CA mode.
Figure 8B:
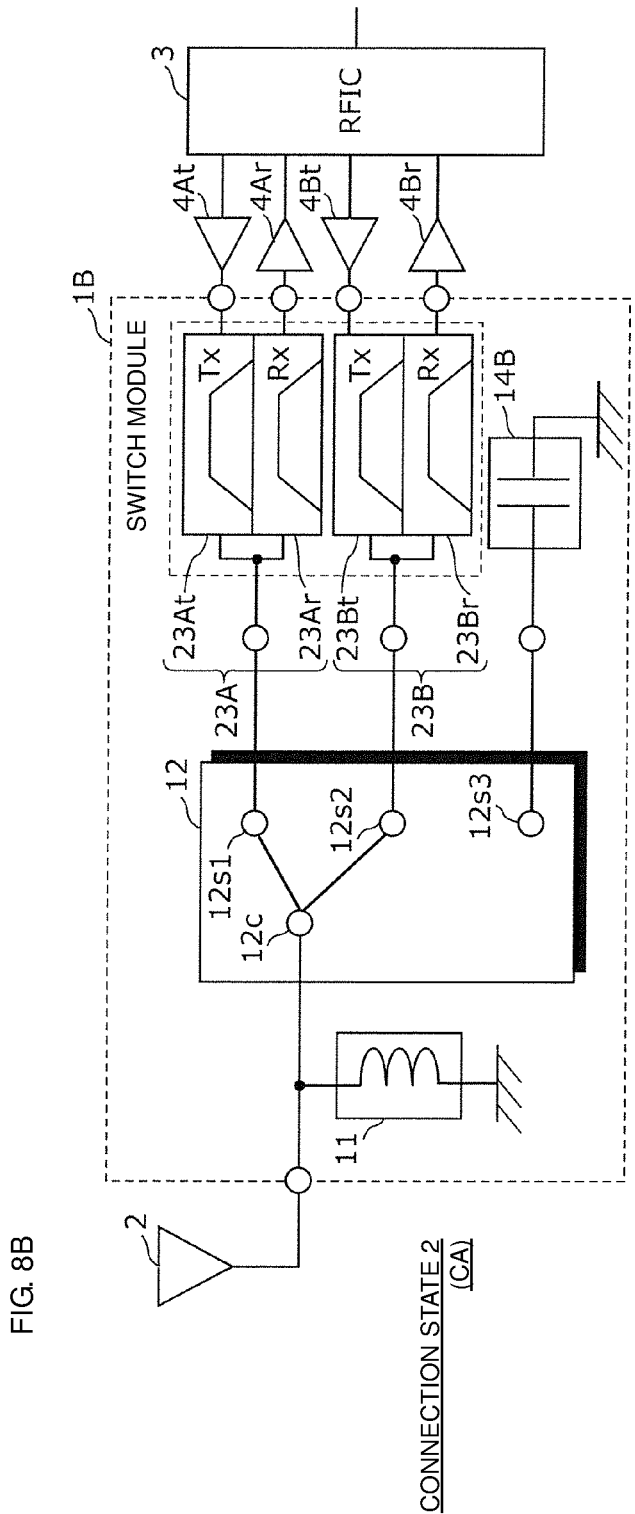
FIG. 8B is a circuit configuration diagram of the switch module according to Preferred Embodiment 2 of the present invention in the CA mode.

FIG. 8A is a circuit configuration diagram of a switch module 1B according to Preferred Embodiment 2 in a non-CA mode. FIG. 8B is a circuit configuration diagram of the switch module 1B according to Preferred Embodiment 2 in a CA mode. FIGS. 8A and 8B illustrate the switch module 1B according to Preferred Embodiment 2, an antenna element 2, transmission signal amplifying circuits 4At and 4Bt, reception signal amplifying circuits 4Ar and 4Br, and an RF signal processing circuit (RFIC) 3. The switch module 1B, the antenna element 2, the transmission signal amplifying circuits 4At and 4Bt, and the reception signal amplifying circuits 4Ar and 4Br are preferably disposed in a front-end unit of a multimode/multiband cellular phone, for example.

In a multiband and multimode wireless communication system, the switch module 1B is disposed between the antenna element 2 and the transmission signal amplifying circuits 4At and 4Bt and between the antenna element 2 and the reception signal amplifying circuits 4Ar and 4Br. The switch module 1B is preferably a radio-frequency switch module that switches connections between the antenna element 2 and signal paths to propagate transmission/reception signals in one or more frequency ranges selected from among a plurality of frequency ranges. The switch module 1B is provided with a plurality of signal paths to transmit/ receive wireless signals by using a plurality of frequency ranges as carriers to achieve multimode/multiband support. Further, the switch module 1B is a circuit that switches a signal path to obtain optimum bandpass characteristics of RF transmission/reception signals when transmitting/receiving wireless signals by using the CA scheme and the non-CA scheme.

The switch module 1B includes an antenna matching circuit 11, an antenna switch 12, transmit filters 23At and 23Bt, receive filters 23Ar and 23Br, and an impedance load circuit 14B.

The switch module 1B according to the present preferred embodiment has a different configuration from the switch module 1 according to Preferred Embodiment 1 in which a plurality of signal paths to propagate transmission/reception signals, instead of a plurality of signal paths to propagate reception signals, are included. In the following, the switch module 1B according to the present preferred embodiment will be described, focusing on differences from the switch module 1 according to Preferred Embodiment 1 without describing the common features.

The transmit filter 23At is a filter circuit that selectively propagates an RF transmission signal in a first frequency range. The receive filter 23Ar is a filter circuit that selectively propagates an RF reception signal in the first frequency range. The transmit filter 23At and the receive filter 23Ar are combined together by fixed wiring to define a duplexer 23A that is a first filter circuit. The duplexer 23A allows an RF transmission signal in the first frequency range and an RF reception signal in the first frequency range to simultaneously pass therethrough in accordance with a frequency division duplexing (FDD) scheme. The first frequency range is exemplified as, for example, LTE standard Band 1 (transmit band: 1920 MHz to 1980 MHz: receive band: 2110 MHz to 2170 MHz).

The transmit filter 23Bt is a filter circuit that selectively propagates an RF transmission signal in a second frequency range. The receive filter 23Br is a filter circuit that selectively propagates an RF reception signal in the second frequency range. The transmit filter 23Bt and the receive filter 23Br are combined together by fixed wiring to define a duplexer 23B that is a second filter circuit. The duplexer 23B allows an RF transmission signal in the second frequency range and an RF reception signal in the second frequency range to simultaneously pass therethrough in accordance with the FDD scheme. The second frequency range is exemplified as, for example, LTE standard Band 3 (transmit band: 1710 MHz to 1785 MHz: receive band: 1805 MHz to 1880 MHz).

The impedance load circuit 14B is a circuit defined by, for example, a capacitive element and having a complex impedance corresponding to the complex capacitive impedance of the duplexer 23A or the duplexer 23B.

The antenna switch 12 is a switch circuit including a common terminal 12c connected to the antenna element 2, a selection terminal 12s1 (first selection terminal) connected to an antenna-side terminal of the duplexer 23A, a selection terminal 12s2 (second selection terminal) connected to an antenna-side terminal of the duplexer 23B, and a selection terminal 12s3 (third selection terminal) connected to an end of the impedance load circuit 14B. With the configuration described above, the antenna switch 12 switches a connection between the common terminal 12c and at least one of the selection terminal 12s1 and the selection terminal 12s2.

The circuit configuration of the switch module 1B illustrated in FIG. 8A indicates connection state 1 when the first frequency range is selected as a band to propagate an RF transmission/reception signal from among the first frequency range and the second frequency range. Connection state 1 corresponds to a non-CA mode in which only one frequency range is selected. As illustrated in FIG. 8A, in connection state 1 (non-CA), the antenna switch 12 connects the common terminal 12c to the selection terminal 12s1 and also connects the common terminal 12c to the selection terminal 12s3. In connection state 1, accordingly, a first circuit is provided in which the antenna element 2, the antenna switch 12, the duplexer 23A, and the impedance load circuit 14B are connected to each other.

The circuit configuration of the switch module 1B illustrated in FIG. 8B indicates connection state 2 when both of the first frequency range and the second frequency range are selected as bands to simultaneously propagate RF transmission/reception signals. Connection state 2 corresponds to a CA mode in which a plurality of frequency ranges are simultaneously selected. As illustrated in FIG. 8B, in connection state 2 (CA), the antenna switch 12 connects the common terminal 12c to the selection terminal 12s1 and also connects the common terminal 12c to the selection terminal 12s2. In connection state 2, accordingly, a second circuit is provided in which the antenna element 2, the antenna switch 12, and the duplexers 23A and 23B are connected to each other.

The impedance load circuit 14B is a circuit that compensates for the complex impedance of the first circuit so that the complex impedance seen on the duplexer side from the common terminal 12c in the first circuit is equal or substantially equal to the complex impedance seen on the duplexer side from the common terminal 12c in the second circuit. For example, when the duplexers 23A and 23B are duplexers including SAW filters or BAW filters, the impedance load circuit 14B is preferably defined by a capacitive element having an equivalent combined capacitance value of the transmission filter 23Bt and the reception filter 23Br in the first frequency range.

That is, instead of the duplexer 23B corresponding to the second frequency range, which is not selected, the impedance load circuit 14B, which is connected to the selection terminal 12s3, is connected to the common terminal 12c. Thus, the bandpass characteristics of RF signals in a mode in which only the first frequency range is selected is able to be made equivalent or substantially equivalent to the bandpass characteristics of RF signals in a CA mode in which both the first frequency range and the second frequency range are selected, without adding an unnecessary inductance component and capacitive component. Therefore, in a system that enables selection of the CA mode and the non-CA mode, signal propagation loss is able to be reduced regardless of which mode is selected.

In addition, the impedance load circuit 14B is disposed separately from a signal path to propagate transmission/reception signals in the first frequency range and the second frequency range, which enables wiring connecting a transmit filter and a receive filter included in a duplexer to define as fixed wiring. Thus, phase changes, amplitude variations, and other variations between transmission signals and reception signals are able to be reduced or prevented.

In the present preferred embodiment, a case in which only the first frequency range is selected is provided as an example of the non-CA mode. However, the switch module 1B according to the present preferred embodiment is also applicable to a system in which only the second frequency range is selected in a non-CA mode. In this case, in a non-CA mode in which only the second frequency range is selected, the impedance load circuit 14B may preferably be defined by a capacitive element having an equivalent capacitance value of the duplexer 23A in the second frequency range.

In the switch module 1B according to the present preferred embodiment, as described below, in the non-CA mode in which the first frequency range is selected, instead of the duplexer 23B corresponding to the second frequency range, which is not selected, the impedance load circuit 14B, which is connected to the third selection terminal, is connected to the common terminal 12c. This enables the bandpass characteristics of RF signals in the non-CA mode to be equivalent or substantially equivalent to the bandpass characteristics of RF signals in the CA mode, without adding an unnecessary inductance component and capacitive component. Therefore, in a system that enables selection of the CA mode and the non-CA mode, signal propagation loss is able to be reduced regardless of which mode is selected.

As described above, the complex impedances of the duplexers 23A and 23B may be capacitive. This enables the complex impedance of a capacitive duplexer to be compensated for by the impedance load circuit 14B, which is defined by a capacitive element, at high accuracy with the parasitic inductance component removed.

For example, when the duplexers 23A and 23B are defined by SAW filters or BAW filters, the steepness of the bandpass characteristics is high and impedances over frequency ranges other than the excitation frequency (pass band) are capacitive. Therefore, in a system that enables selection of the CA mode and the non-CA mode, a complex capacitive impedance is able to be accurately and easily compensated for by the impedance load circuit 14B, which is defined by a capacitive element, regardless of which mode is selected.

As described above, furthermore, the impedance load circuit 14B is preferably defined by a capacitive element. When the impedance load circuit 14B is defined by a capacitive element, it is preferable to remove, at a maximum, an inductance component not contributing to impedance matching in order to optimize the bandpass characteristics of RF signals. From this viewpoint, in the configuration of the present preferred embodiment, the impedance load circuit 14B is directly connected to the selection terminal 12s3 of the antenna switch 12, which enables a reduction in the length of wiring between a selected duplexer and the impedance load circuit 14B via the common terminal 12c. As a result, no unnecessary inductance component is added. Thus, impedance matching between the antenna element 2 and a duplexer is able to be achieved with high accuracy, which enables an effective reduction of signal propagation loss.

A circuit element other than a capacitive element, such as an inductive element, may be added to the impedance load circuit 14B.

Preferred Embodiment 3

In Preferred Embodiment 1, the description has been provided of a configuration in which the antenna switch 12 switches between two frequency ranges. In Preferred Embodiment 3 of the present invention, in contrast, a description will be provided of a configuration in which an antenna switch 22 switches among three (three or more) frequency ranges.

Figure 9A:
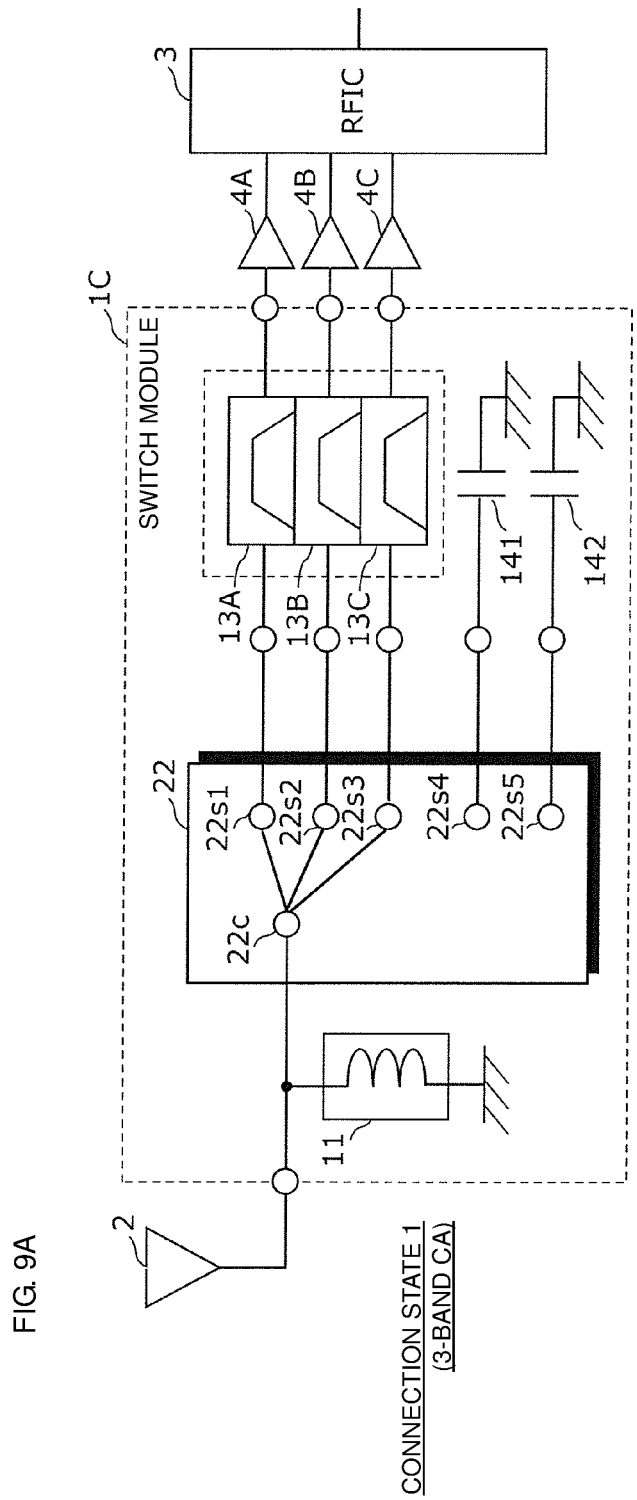
FIG. 9A is a circuit configuration diagram of a switch module according to Preferred Embodiment 3 of the present invention in connection state 1.
Figure 9B:
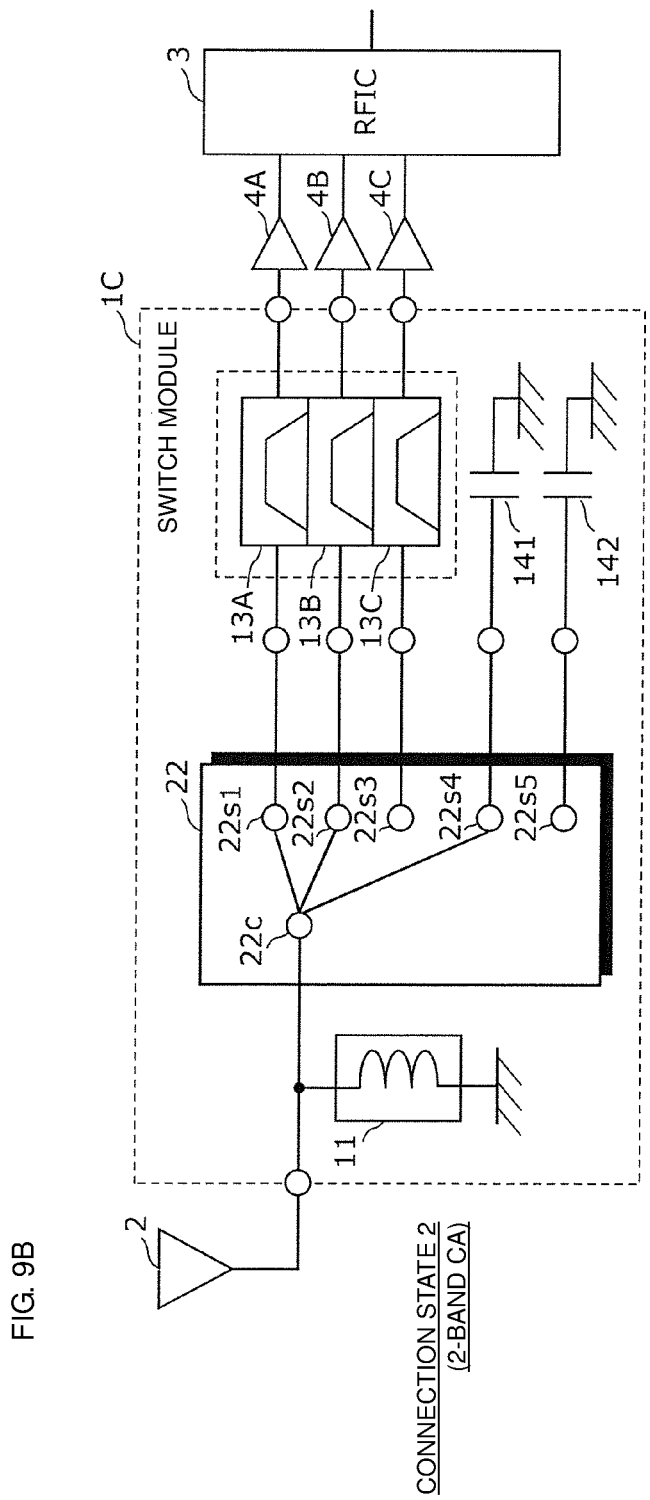
FIG. 9B is a circuit configuration diagram of the switch module according to Preferred Embodiment 3 of the present invention in connection state 2.
Figure 9C:
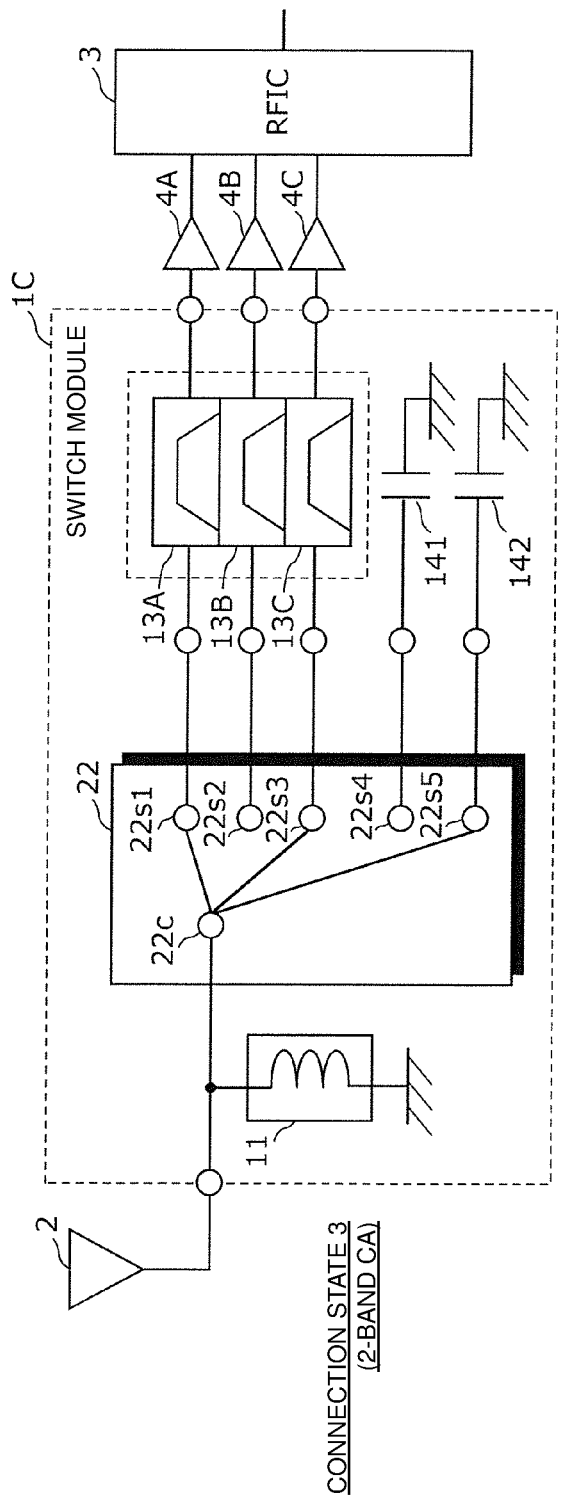
FIG. 9C is a circuit configuration diagram of the switch module according to Preferred Embodiment 3 of the present invention in connection state 3.
Figure 9D:
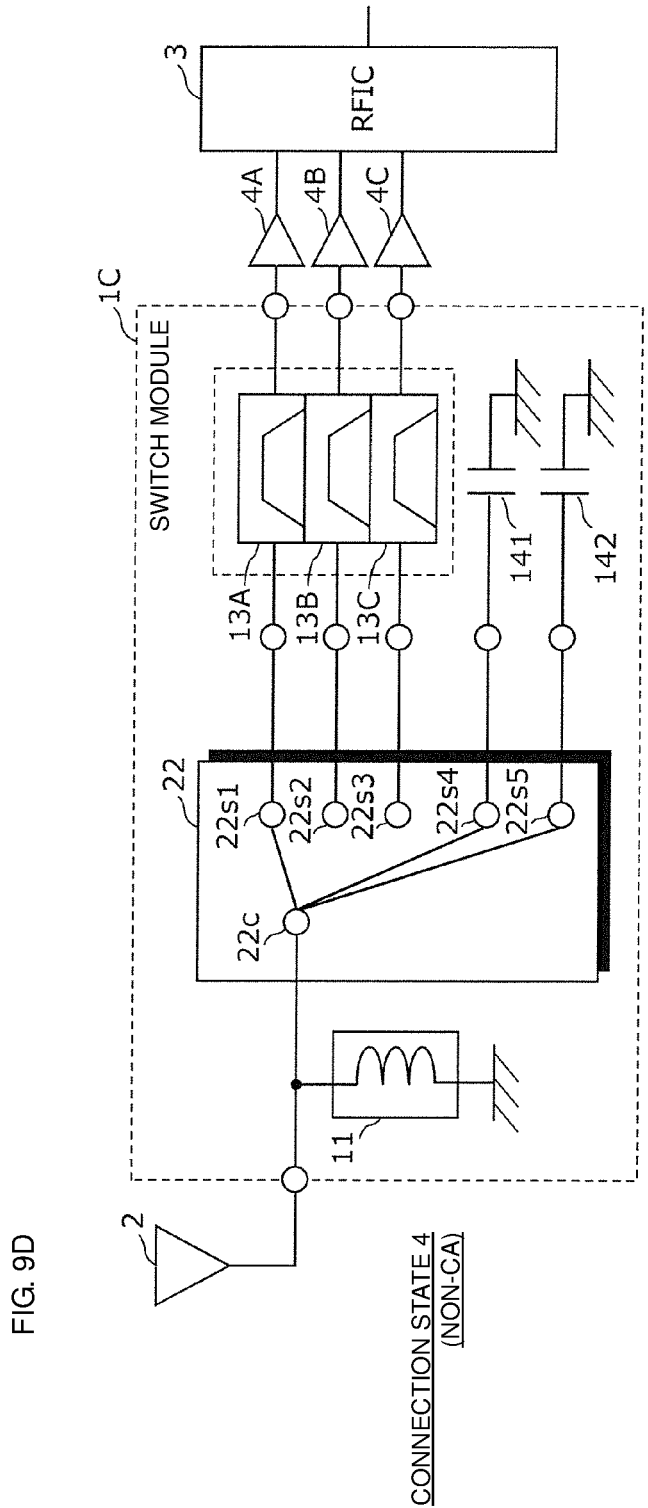
FIG. 9D is a circuit configuration diagram of the switch module according to Preferred Embodiment 3 of the present invention in connection state 4.
Figure 10A:
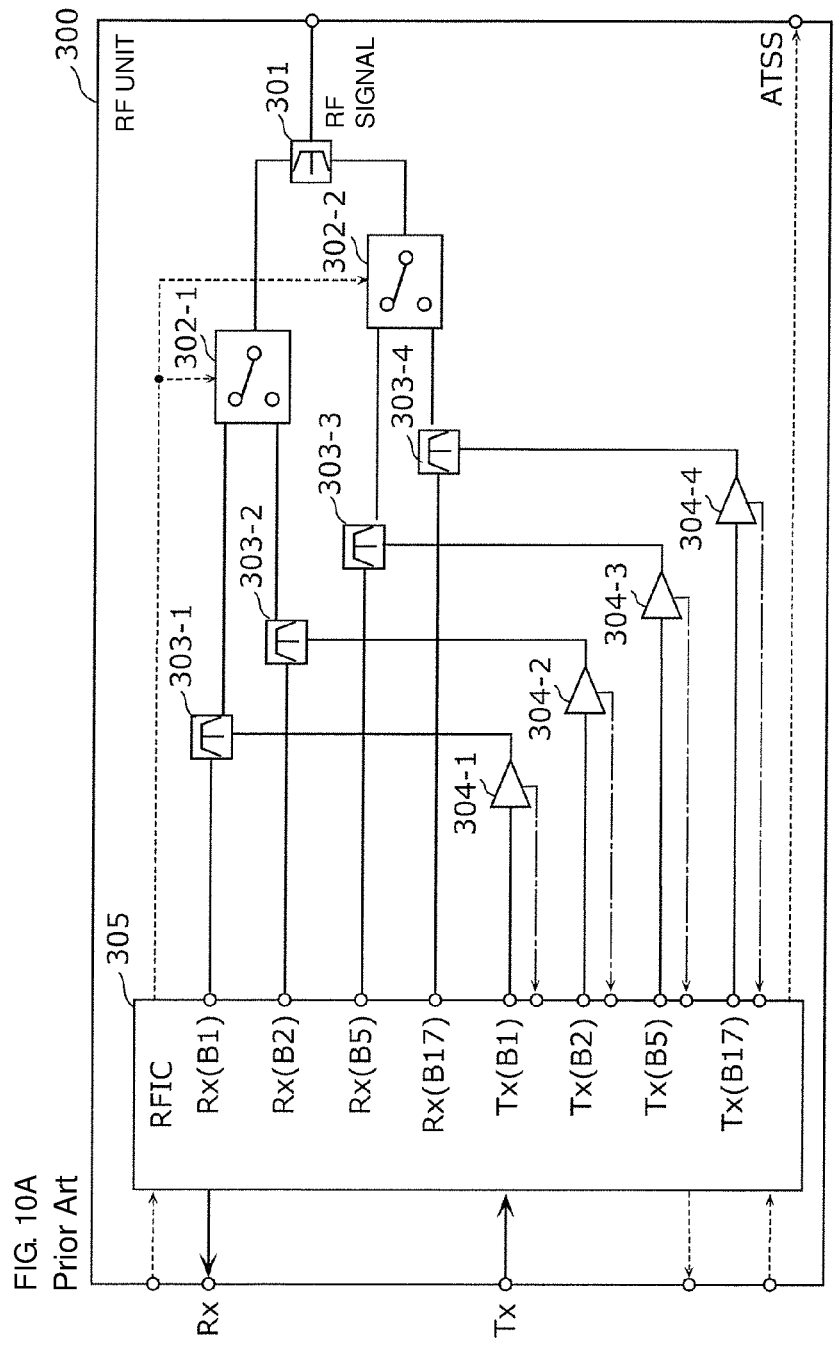
FIG. 10A is a block diagram illustrating part of the internal configuration of an RF unit described in Japanese Unexamined Patent Application Publication No. 2014-187647.
Figure 10B:
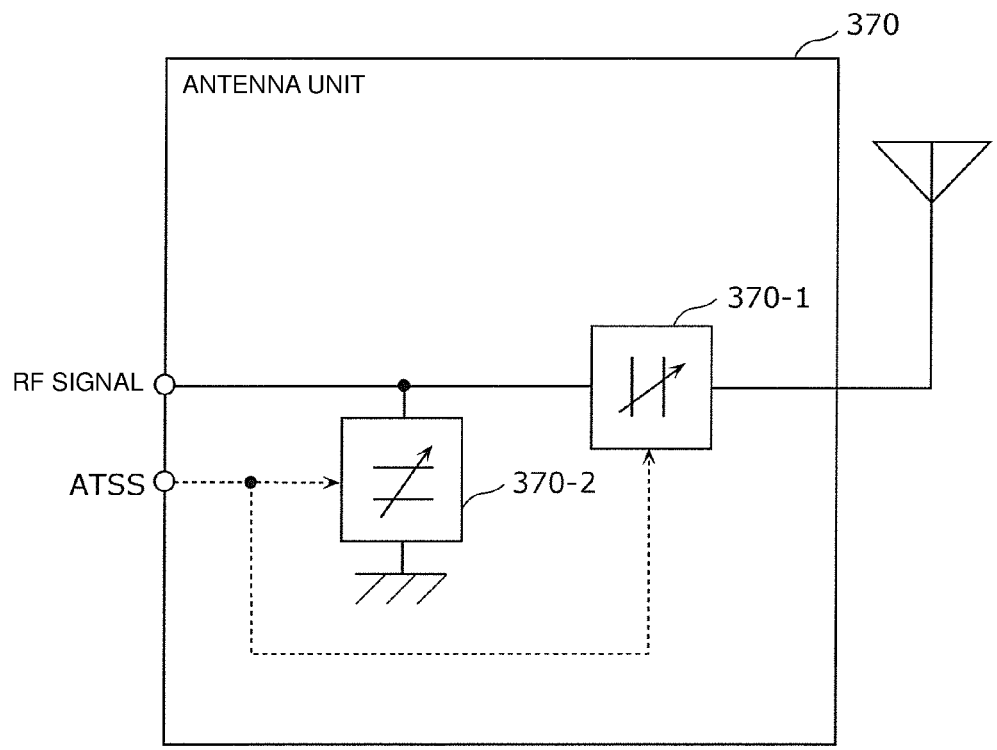
FIG. 10B is a block diagram illustrating part of the internal configuration of an antenna unit described in Japanese Unexamined Patent Application Publication No. 2014-187647.

FIG. 9A is a circuit configuration diagram of a switch module 1C according to Preferred Embodiment 3 in connection state 1. FIG. 9B is a circuit configuration diagram of the switch module 1C according to Preferred Embodiment 3 in connection state 2. FIG. 9C is a circuit configuration diagram of the switch module 1C according to Preferred Embodiment 3 in connection state 3. FIG. 9D is a circuit configuration diagram of the switch module 1C according to Preferred Embodiment 3 in connection state 4. FIGS. 9A to 9D illustrate the switch module 1C according to Preferred Embodiment 3, an antenna element 2, reception signal amplifying circuits 4A, 4B, and 4C, and an RF signal processing circuit (RFIC) 3. The switch module 1C, the antenna element 2, and the reception signal amplifying circuits 4A, 4B, and 4C are preferably disposed in a front-end unit of a multimode/multiband cellular phone, for example.

In a multiband and multimode wireless communication system, the switch module 1C is disposed between the antenna element 2 and the reception signal amplifying circuits 4A, 4B, and 4C. The switch module 1C is preferably a radio-frequency switch module that switches connections between the antenna element 2 and signal paths to propagate reception signals in one or more frequency ranges selected from among a plurality of frequency ranges. The switch module 1C is provided with a plurality of signal paths to receive wireless signals by using a plurality of frequency ranges as carriers to achieve multimode/multiband support. Further, the switch module 1C is a circuit that switches a signal path to obtain optimum bandpass characteristics of a radio-frequency reception signal when receiving a wireless signal by using a CA scheme in which a plurality of frequency ranges are simultaneously used as a single communication signal and a non-CA scheme. In the CA scheme, the switch module 1C is connected to a signal control circuit such that a single communication signal is separated into transmission signals having a plurality of frequency ranges or is separated into reception signals having a plurality of frequency ranges. The switch module 1C includes an antenna matching circuit 11, the antenna switch 22, filters 13A, 13B, and 13C, and capacitive elements 141 and 142.

The switch module 1C according to the present preferred embodiment has a different configuration from the switch module 1 according to Preferred Embodiment 1 in which three frequency ranges, rather than two frequency ranges, are used to propagate reception signals. In the following description, the switch module 1C according to the present preferred embodiment will be described, focusing on differences from the switch module 1 according to Preferred Embodiment 1 without describing the common features.

The filter 13A is a first filter circuit that selectively propagates an RF reception signal in a first frequency range. The first frequency range is exemplified as, for example, LTE standard Band 1 (receive band: 2110 MHz to 2170 MHz).

The filter 13B is a second filter circuit that selectively propagates an RF reception signal in a second frequency range lower than the first frequency range. The second frequency range is exemplified as, for example, LTE standard Band 3 (receive band: 1805 MHz to 1880 MHz).

The filter 13C is a third filter circuit that selectively propagates an RF reception signal in a third frequency range higher than the first frequency range and the second frequency range. The third frequency range is exemplified as, for example, LTE standard Band 7 (receive band: 2620 MHz to 2690 MHz).

Each of the capacitive elements 141 and 142 is an example of an impedance load circuit having a complex impedance corresponding to the complex impedance of each of the filters 13A to 13C or the combined complex impedance of at least two of the filters 13A to 13C.

The antenna switch 22 is a switch circuit preferably including a common terminal 22c connected to the antenna element 2, a selection terminal 22s1 connected to an end of the filter 13A, a selection terminal 22s2 connected to an end of the filter 13B, a selection terminal 22s3 connected to an end of the filter 13C, a selection terminal 22s4 connected to an end of the capacitive element 141, and a selection terminal 22s5 connected to an end of the capacitive element 142. With the configuration described above, the antenna switch 22 switches a connection between the common terminal 22c and at least one of the selection terminal 22s1, the selection terminal 22s2, and the selection terminal 22s3.

The circuit configuration of the switch module 1C illustrated in FIG. 9A indicates connection state 1 (3-band CA) when all of the first frequency range, the second frequency range, and the third frequency range are selected as bands for simultaneously propagating RF reception signals. Connection state 1 corresponds to a CA mode in which a plurality of frequency ranges are all selected simultaneously. As illustrated in FIG. 9A, in connection state 1, the antenna switch 22 connects the common terminal 22c to the selection terminals 22s1, 22s2, and 22s3. In connection state 1, accordingly, a fourth circuit is provided in the antenna element 2, the antenna switch 22, and the filters 13A, 13B, and 13C are connected to each other.

The circuit configuration of the switch module 1C illustrated in FIG. 9B indicates connection state 2 (2-band CA) when the first frequency range and the second frequency range are selected as bands to propagate RF reception signals. Connection state 2 corresponds to a CA mode in which two frequency ranges are selected from among the three frequency ranges. As illustrated in FIG. 9B, in connection state 2, the antenna switch 22 connects the common terminal 22c to the selection terminals 22s1 and 22s2 and also connects the common terminal 22c to the selection terminal 22s4. In connection state 2, accordingly, a third circuit is provided in which the antenna element 2, the antenna switch 22, the filters 13A and 13B, and the capacitive element 141 are connected to each other.

The capacitive element 141 is a circuit that compensates for the complex impedance of the third circuit so that the complex impedance seen on the filter side from the common terminal 22c in the third circuit is equal or substantially equal to the complex impedance seen on the filter side from the common terminal 22c in the fourth circuit. For example, when the filters 13A to 13C are SAW filters or BAW filters, the capacitive element 141 is preferably defined by a capacitive element having an equivalent or substantially equivalent capacitance value of the filter 13C in the first frequency range and the second frequency range.

That is, instead of the filter 13C corresponding to the third frequency range, which is not selected, the capacitive element 141, which is connected to the selection terminal 22s4, is connected to the common terminal 22c. Thus, the bandpass characteristics of RF signals in the CA mode in which the first frequency range and the second frequency range are selected are able to be made equivalent or substantially equivalent to the bandpass characteristics of RF signals in the CA mode in which all the frequency ranges are selected, without adding an unnecessary inductance component and capacitive component. Therefore, in a system that enables selection of a plurality of CA modes, signal propagation loss is able to be reduced.

The circuit configuration of the switch module 1C illustrated in FIG. 9C indicates connection state 3 (2-band CA) when the first frequency range and the third frequency range are selected as bands to propagate RF reception signals. Connection state 3 corresponds to a CA mode in which two frequency ranges are selected from among the three frequency ranges. As illustrated in FIG. 9C, in connection state 3, the antenna switch 22 connects the common terminal 22c to the selection terminals 22s1 and 22s3 and also connects the common terminal 22c to the selection terminal 22s5. In connection state 3, accordingly, a third circuit is provided in which the antenna element 2, the antenna switch 22, the filters 13A and 13C, and the capacitive element 142 are connected to each other.

The capacitive element 142 is a circuit that compensates for the complex impedance of the third circuit so that the complex impedance seen on the filter side from the common terminal 22c in the third circuit is equal or substantially equal to the complex impedance seen on the filter side from the common terminal 22c in the fourth circuit. For example, when the filters 13A to 13C are SAW filters or BAW filters, the capacitive element 142 is preferably defined by a capacitive element having an equivalent or substantially equivalent capacitance value of the filter 13B in the first frequency range and the third frequency range.

That is, instead of the filter 13B corresponding to the second frequency range, which is not selected, the capacitive element 142, which is connected to the selection terminal 22s5, is connected to the common terminal 22c. Thus, the bandpass characteristics of RF signals in the CA mode in which the first frequency range and the third frequency range are selected are able to be made equivalent or substantially equivalent to the bandpass characteristics of RF signals in the CA mode in which all the frequency ranges are selected, without adding an unnecessary inductance component and capacitive component. Therefore, in a system that enables selection of a plurality of CA modes, signal propagation loss is able to be reduced.

The circuit configuration of the switch module 1C illustrated in FIG. 9D indicates connection state 4 (non-CA) when only the first frequency range is selected as a band to propagate an RF reception signal. Connection state 4 corresponds to a non-CA mode in which one frequency range is selected from among the three frequency ranges. As illustrated in FIG. 9D, in connection state 4, the antenna switch 22 connects the common terminal 22c to the selection terminal 22s1 and also connects the common terminal 22c to the selection terminals 22s4 and 22s5. In connection state 4, accordingly, a third circuit is provided in which the antenna element 2, the antenna switch 22, the filter 13A, and the capacitive elements 141 and 142 are connected to each other.

The capacitive elements 141 and 142 are each a circuit that compensates for the complex impedance of the third circuit so that the complex impedance seen on the filter side from the common terminal 22c in the third circuit is equal or substantially equal to the complex impedance seen on the filter side from the common terminal 22c in the fourth circuit. For example, when the filters 13A to 13C are SAW filters or BAW filters, the capacitive elements 141 and 142 are preferably defined by parallel-connected capacitive elements having an equivalent or substantially equivalent combined capacitance value of the filters 13B and 13C in the first frequency range.

That is, instead of the filters 13B and 13C corresponding to the second frequency range and the third frequency range, which are not selected, the capacitive element 141, which is connected to the selection terminal 22s4, and the capacitive element 142, which is connected to the selection terminal 22s5, are connected to the common terminal 22c. Thus, the bandpass characteristics of RF signals in the non-CA mode in which only the first frequency range is selected are able to be made equivalent or substantially equivalent to the bandpass characteristics of RF signals in the CA mode in which all the frequency ranges are selected, without adding an unnecessary inductance component and capacitive component. Therefore, in a system that enables selection of the CA mode and the non-CA mode, signal propagation loss is able to be reduced regardless of which mode is selected.

While the switch module 1C according to the present preferred embodiment preferably has a configuration in which the two capacitive elements 141 and 142 are arranged as impedance load circuits, the number of capacitive elements to be arranged is not limited to this. The number of capacitive elements to be arranged may be increased in accordance with the intended or desired use.

In the switch module 1C according to the present preferred embodiment, as described above, in a mode in which two or less frequency ranges are selected from among the first frequency range to the third frequency range, instead of a filter circuit corresponding to a frequency range that is not selected, at least one of the capacitive elements 141 and 142, which are connected to the selection terminal 22s4 and the selection terminal 22s5, is preferably connected to the common terminal 22c. This enables the bandpass characteristics of RF signals in a mode in which two or less frequency ranges are selected to be equivalent or substantially equivalent to the bandpass characteristics of RF signals in the CA mode in which all of the frequency ranges are selected, without adding an unnecessary inductance component and capacitive component. Therefore, in a system that enables selection of the CA mode and the non-CA mode, signal propagation loss is able to be reduced regardless of which mode is selected.

As described above, the complex impedances of the filters 13A, 13B, and 13C may preferably be capacitive. This enables the complex impedance of a capacitive filter circuit to be compensated for by impedance load circuits, which are defined by the capacitive elements 141 and 142, at high accuracy with the parasitic inductance component removed.

For example, when the filters 13A, 13B, and 13C are SAW filters or BAW filters, the steepness of the bandpass characteristics is high and impedances over frequency ranges other than the excitation frequency (pass band) are capacitive. Therefore, in a system that enables selection of the CA mode and the non-CA mode, a complex capacitive impedance is able to be accurately and easily compensated for by an impedance load circuit constituted by a capacitive element, regardless of which mode is selected.

As in the present preferred embodiment, the impedance load circuit is preferably defined by a capacitive element. When the impedance load circuit is defined by a capacitive element, it is preferable to remove, at a maximum, an inductance component not contributing to impedance matching in order to optimize the bandpass characteristics of RF signals. From this viewpoint, in the configuration of the present preferred embodiment, the capacitive elements 141 and 142 are directly connected to the selection terminals 22s4 and 22s5 of the antenna switch 22, respectively, which enables a reduction in the length of wiring between a selected filter circuit and the capacitive elements via the common terminal 22c. As a result, no unnecessary inductance component is added. Thus, impedance matching between the antenna element 2 and a filter circuit is able to be achieved with high accuracy, which enables effective reduction of signal propagation loss.

A circuit element other than the capacitive elements 141 and 142, such as an inductive element, may be added to impedance load circuits to be connected to the selection terminals 22s4 and 22s5.

The switch module 1C according to the present preferred embodiment is not limited to a configuration in which three frequency ranges are arranged. The switch module 1C according to the present preferred embodiment is also applicable to a configuration in which n (n being a natural number greater than or equal to 2) frequency ranges are arranged.

That is, the switch module 1C according to the present preferred embodiment is capable of selecting a CA mode in which at least two frequency ranges out of n (n being a natural number greater than or equal to 2) frequency ranges are simultaneously used and a non-CA mode in which one frequency range is used, and includes n filter circuits, each of the n filter circuits allowing a corresponding signal in n frequency ranges to selectively pass therethrough, and m (m being a natural number greater than or equal to 1) impedance load circuits. The switch module 1C further includes an antenna switch including a single common terminal, n selection terminals each connected to a corresponding one of the n filter circuits arranged to correspond to the n frequency ranges, and m selection terminals each connected to a corresponding one of the m impedance load circuits.

When all of the n filter circuits are selected, the antenna switch connects the common terminal to the n selection terminals corresponding to the n filter circuits and does not connect the common terminal to the m selection terminals corresponding to the m impedance load circuits.

When (n−1) or less filter circuits are selected, the antenna switch connects the common terminal to (n−1) or less selection terminals corresponding to the (n−1) or less filter circuits and connects at least one of the m impedance load circuits to at least one of the m selection terminal so that the complex impedance of a third circuit configured such that the (n−1) or less filter circuits are combined together by the common terminal is equal to the complex impedance of a fourth circuit configured such that the n filter circuits are combined together by the common terminal.

With this configuration, when an RF signal is propagated in a mode in which (n−1) or less frequency ranges are selected from among the n frequency ranges, (n−1) or less filter circuits that allow the selected (n−1) or less frequency ranges to pass therethrough and at least one of the m impedance load circuits are combined together by the common terminal. That is, instead of a filter circuit corresponding to a frequency range that is not selected, at least one of the m impedance load circuits connected to the m selection terminals is connected to the common terminal. Thus, the bandpass characteristics of RF signals in a mode in which (n−1) or less frequency ranges are selected are able to be made equivalent or substantially equivalent to the bandpass characteristics of RF signals in a mode in which the n frequency ranges are selected, without adding an unnecessary inductance component and capacitive component. Therefore, in a system that enables selection of the CA mode and the non-CA mode, signal propagation loss is able to be reduced regardless of which mode is selected.

In addition, an impedance load circuit to be connected from among the m impedance load circuits is able to be variably selected in accordance with the combination of frequency ranges selected from among the n frequency ranges, and this variable selection makes the combined capacitance for impedance compensation variable. Additionally, the m impedance load circuits correspond to the m selection terminals, such that a plurality of selection terminals to be connected to the common terminal are selected from among the m selection terminals, thus achieving more than m compensation impedances. Therefore, the number of impedance load circuits to be provided and the arrangement areas are able to be reduced, which enables a reduction in the area of the switch module 1C.

While switch modules according to preferred embodiments of the present invention have been described with reference to preferred embodiments and modifications thereof, a switch module of the present invention is not limited to those of the preferred embodiments and the modification described above. Other preferred embodiments obtained by combining any element in the preferred embodiments and the modifications, additional modifications obtained by making various modifications conceivable by those skilled in the art to the preferred embodiments and the modifications without departing from the gist of the present invention, and various devices including switch modules of the present disclosure are also included in the present invention.

For example, in the switch modules according to Preferred Embodiments 2 and 3, as in the modification of Preferred Embodiment 1, an impedance load circuit(s) and filter circuits may be defined by a single chip. In the switch modules according to Preferred Embodiments 2 and 3, furthermore, an impedance load circuit(s) may be included in a chip for an antenna switch. Thus, the switch modules according to Preferred Embodiments 2 and 3 also achieve advantages similar to those of the switch module according to Preferred Embodiment 1.

A switch control unit according to a preferred embodiment of the present invention may be an IC or LSI (Large Scale Integration), which is an integrated circuit. In addition, a technique to produce an integrated circuit may be provided by using a dedicated circuit or a general-purpose processor. An FPGA (Field Programmable Gate Array) that is programmable after the manufacture of the LSI or a reconfigurable processor that is able to reconfigure connections or settings of circuit cells in the LSI may be used. Additionally, if a technique to produce an integrated circuit that substitutes the LSI in accordance with the progress of semiconductor technology or other derived technology, naturally, the functional blocks may be integrated by using the technique.

In the switch modules according to the preferred embodiments described above and the modification thereof, different radio-frequency circuit elements, wiring, and other elements may be provided between the circuit elements and paths connecting signal paths disclosed in the drawings.

Preferred embodiments of the present invention provide multiband/multimode switch modules that use a carrier aggregation scheme, which is widely used in communication devices, such as cellular phones.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switch module capable of selecting a state in which a first frequency range for wireless communication and a second frequency range for wireless communication that is a different frequency range from the first frequency range are simultaneously used, the switch module comprising:
   a first filter circuit that allows a signal in the first frequency range to selectively pass therethrough;
   a second filter circuit that allows a signal in the second frequency range to selectively pass therethrough;
   an impedance load circuit; and
   a switch circuit including a common terminal connected to an antenna element, a first selection terminal connected to an end of the first filter circuit, a second selection terminal connected to an end of the second filter circuit, and a third selection terminal connected to the impedance load circuit, the switch circuit switching a connection between the common terminal and at least one of the first selection terminal and the second selection terminal; wherein when both of the first frequency range and the second frequency range are selected, the switch circuit connects the common terminal to the first selection terminal and the second selection terminal and does not connect the common terminal to the third selection terminal; and when only one of the first frequency range and the second frequency range is selected, the switch circuit connects the common terminal to the only one of the first selection terminal and the second selection terminal and connects the common terminal to the third selection terminal.

2. The switch module according to claim 1, further comprising:

a switch control unit that, upon receipt of selection information of a frequency range to be used for wireless communication, outputs a control signal based on the selection information to the switch circuit; wherein the switch control unit outputs the control signal to the switch circuit such that when both of the first frequency range and the second frequency range are selected, the switch circuit connects the common terminal to the first selection terminal and the second selection terminal and does not connect the common terminal to the third selection terminal; and when only one of the first frequency range and the second frequency range is selected, the switch circuit connects the common terminal to the only one of the first selection terminal and the second selection terminal and connects the common terminal to the third selection terminal.

3. The switch module according to claim 1, wherein the impedance load circuit is a circuit that compensates for a complex impedance of a first circuit provided when the only one of the first frequency range and the second frequency range is selected, so that the complex impedance of the first circuit is equal or substantially equal to a complex impedance of a second circuit provided when the first frequency range and the second frequency range are simultaneously used, the first circuit being defined by the only one of the first filter circuit and the second filter circuit connected to the common terminal, the second circuit being defined by the first filter circuit and the second filter circuit combined together by the common terminal.

4. The switch module according to claim 1, wherein the switch module operates in a carrier aggregation mode when both of the first frequency range and the second frequency range are selected, and operates in a non-carrier aggregation mode when only one of the first frequency range and the second frequency range is selected.

5. The switch module according to claim 1, wherein the switch module enables simultaneous use of at least two filter circuits out of n (n being a natural number greater than or equal to 2) filter circuits including the first filter circuit and the second filter circuit, each of the n filter circuits allowing a signal in a corresponding one of n frequency ranges including the first frequency range and the second frequency range to selectively pass therethrough;

the switch module further includes:

the n filter circuits; and m (m being a natural number greater than or equal to 1) impedance load circuits including the impedance load circuit;

the switch circuit includes one common terminal, n selection terminals each connected to a corresponding one of the n filter circuits corresponding to the n frequency ranges, and m selection terminals each connected to a corresponding one of the m impedance load circuits; and when the n filter circuits are selected, the switch circuit connects the common terminal to the n selection terminals corresponding to the n filter circuits, and does not connect the common terminal to the m selection terminals corresponding to the m impedance load circuits; and when (n−1) or less filter circuits are selected, the switch circuit connects the common terminal to (n−1) or less selection terminals corresponding to the (n−1) or less filter circuits and connects at least one of the m impedance load circuits to at least one of the m selection terminal so that a complex impedance of a third circuit defined by the (n−1) or less filter circuits being are combined together by the common terminal is equal or substantially equal to a complex impedance of a fourth circuit defined by the n filter circuits being combined together by the common terminal.

6. The switch module according to claim 1, wherein the impedance load circuit is defined by a capacitive element.

7. The switch module according to claim 6, wherein an out-of-pass-band complex impedance of the first filter circuit and the second filter circuit is capacitive.

8. The switch module according to claim 6, wherein the first filter circuit and the second filter circuit are surface acoustic wave filters or bulk acoustic wave filters.

9. The switch module according to claim 6, wherein the capacitive element is defined by a chip that is identical or substantially identical to a chip defining at least one of the first filter circuit and the second filter circuit.

10. The switch module according to claim 9, wherein the first filter circuit and the second filter circuit are surface acoustic wave filters that are defined by a piezoelectric substrate and interdigital transducer electrodes provided on the piezoelectric substrate;

the capacitive element is defined by interdigital transducer electrodes provided on the piezoelectric substrate, which defines at least one of the first filter circuit and the second filter circuit; and an arrangement direction of the interdigital transducer electrodes defining at least one of the first filter circuit and the second filter circuit, which are provided on the piezoelectric substrate, is different from an arrangement direction of the interdigital transducer electrodes defining the capacitive element, which are provided on the piezoelectric substrate.

11. The switch module according to claim 6, wherein the capacitive element is included in a single chip including the switch circuit.

12. A multiband and multimode wireless communication system comprising:

the switch module according to claim 1;

an antenna element; and reception signal amplifying circuits; wherein the switch module is connected between the antenna element and the reception signal amplifying circuits.

13. The multiband and multimode wireless communication system according to claim 12, further comprising:

a switch control unit that, upon receipt of selection information of a frequency range to be used for wireless communication, outputs a control signal based on the selection information to the switch circuit; wherein the switch control unit outputs the control signal to the switch circuit such that:

when both of the first frequency range and the second frequency range are selected, the switch circuit connects the common terminal to the first selection terminal and the second selection terminal and does not connect the common terminal to the third selection terminal; and when only one of the first frequency range and the second frequency range is selected, the switch circuit connects the common terminal to the only one of the first selection terminal and the second selection terminal and connects the common.

14. The multiband and multimode wireless communication system according to claim 12, wherein the impedance load circuit is a circuit that compensates for a complex impedance of a first circuit provided when the only one of the first frequency range and the second frequency range is selected, so that the complex impedance of the first circuit is equal or substantially equal to a complex impedance of a second circuit provided when the first frequency range and the second frequency range are simultaneously used, the first circuit being defined by the only one of the first filter circuit and the second filter circuit connected to the common terminal, the second circuit being defined by the first filter circuit and the second filter circuit combined together by the common terminal.

15. The multiband and multimode wireless communication system according to claim 12, wherein the switch module operates in a carrier aggregation mode when both of the first frequency range and the second frequency range are selected, and operates in a non-carrier aggregation mode when only one of the first frequency range and the second frequency range is selected.

16. The multiband and multimode wireless communication system according to claim 12, wherein the switch module enables simultaneous use of at least two filter circuits out of n (n being a natural number greater than or equal to 2) filter circuits including the first filter circuit and the second filter circuit, each of the n filter circuits allowing a signal in a corresponding one of n frequency ranges including the first frequency range and the second frequency range to selectively pass therethrough;

the switch module further includes:

the n filter circuits; and m (m being a natural number greater than or equal to 1) impedance load circuits including the impedance load circuit;

the switch circuit includes one common terminal, n selection terminals each connected to a corresponding one of the n filter circuits corresponding to the n frequency ranges, and m selection terminals each connected to a corresponding one of the m impedance load circuits; and when the n filter circuits are selected, the switch circuit connects the common terminal to the n selection terminals corresponding to the n filter circuits, and does not connect the common terminal to the m selection terminals corresponding to the m impedance load circuits; and when (n−1) or less filter circuits are selected, the switch circuit connects the common terminal to (n−1) or less selection terminals corresponding to the (n−1) or less filter circuits and connects at least one of the m impedance load circuits to at least one of the m selection terminal so that a complex impedance of a third circuit defined by the (n−1) or less filter circuits being are combined together by the common terminal is equal or substantially equal to a complex impedance of a fourth circuit defined by the n filter circuits being combined together by the common terminal.

17. The multiband and multimode wireless communication system according to claim 12, wherein the impedance load circuit is defined by a capacitive element.

18. The multiband and multimode wireless communication system according to claim 17, wherein an out-of-passband complex impedance of the first filter circuit and the second filter circuit is capacitive.

19. The multiband and multimode wireless communication system according to claim 17, wherein the first filter circuit and the second filter circuit are surface acoustic wave filters or bulk acoustic wave filters.

20. The multiband and multimode wireless communication system according to claim 17, wherein the capacitive element is defined by a chip that is identical or substantially identical to a chip defining at least one of the first filter circuit and the second filter circuit.

* * * * *